Figure 1:
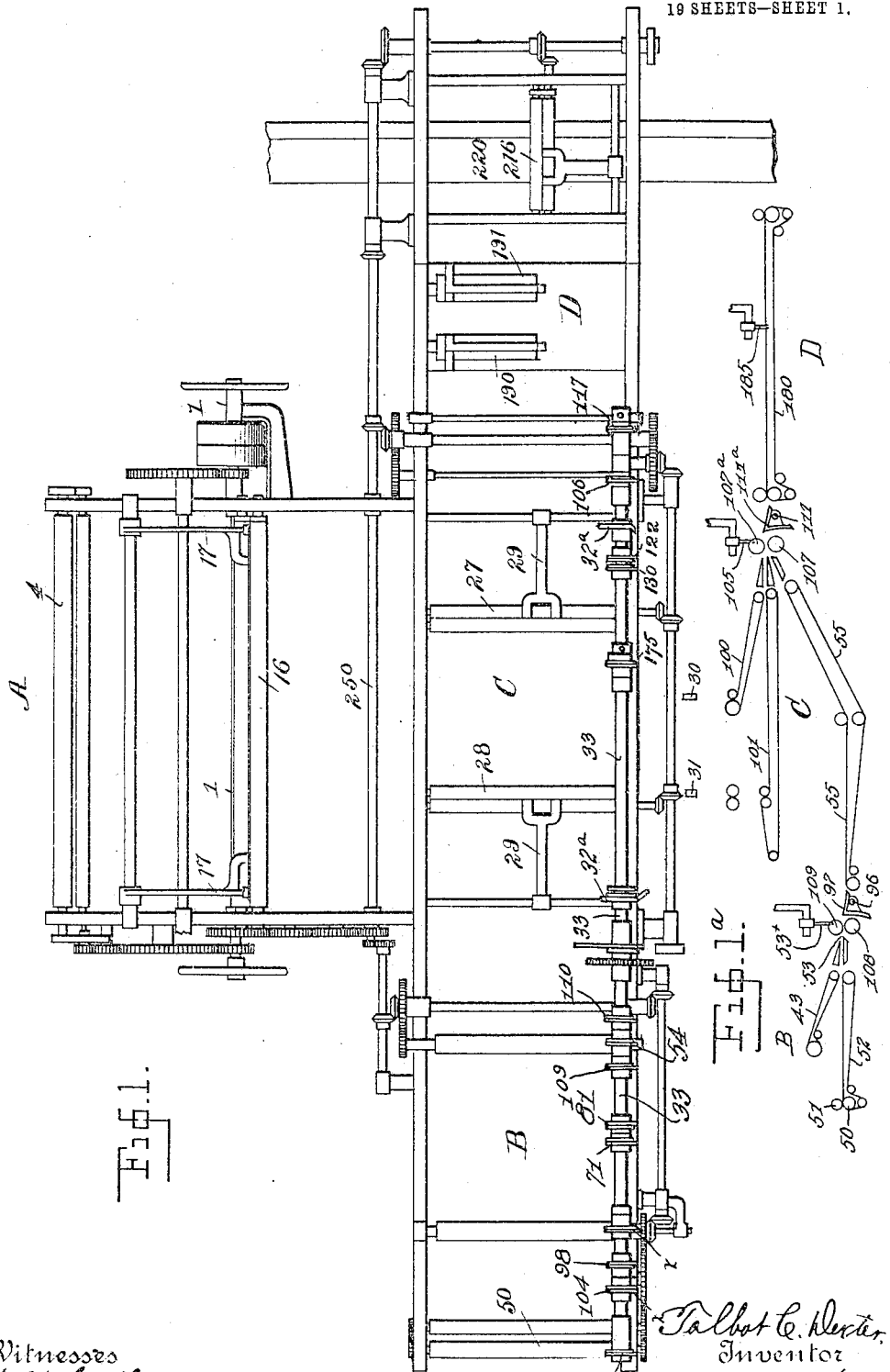

No. 787,838. PATENTED APR. 18, 1905.
T. C. DEXTER.
PAPER ASSEMBLING, STITCHING, AND FOLDING MACHINE.
APPLICATION FILED AUG. 5, 1902.

19 SHEETS—SHEET 2.

Witnesses
M. A. Witherell.
O. T. Somak.

Talbot C. Dexter,
Inventor
By his Attorneys Knight Bros.

No. 787,838. PATENTED APR. 18, 1905.
T. C. DEXTER.
PAPER ASSEMBLING, STITCHING, AND FOLDING MACHINE.
APPLICATION FILED AUG. 5, 1902.

19 SHEETS—SHEET 4.

WITNESSES:
M. A. Witherell.
O. F. Sonnek.

INVENTOR
Talbot C. Dexter
BY Knight & Bros
ATTORNEYS

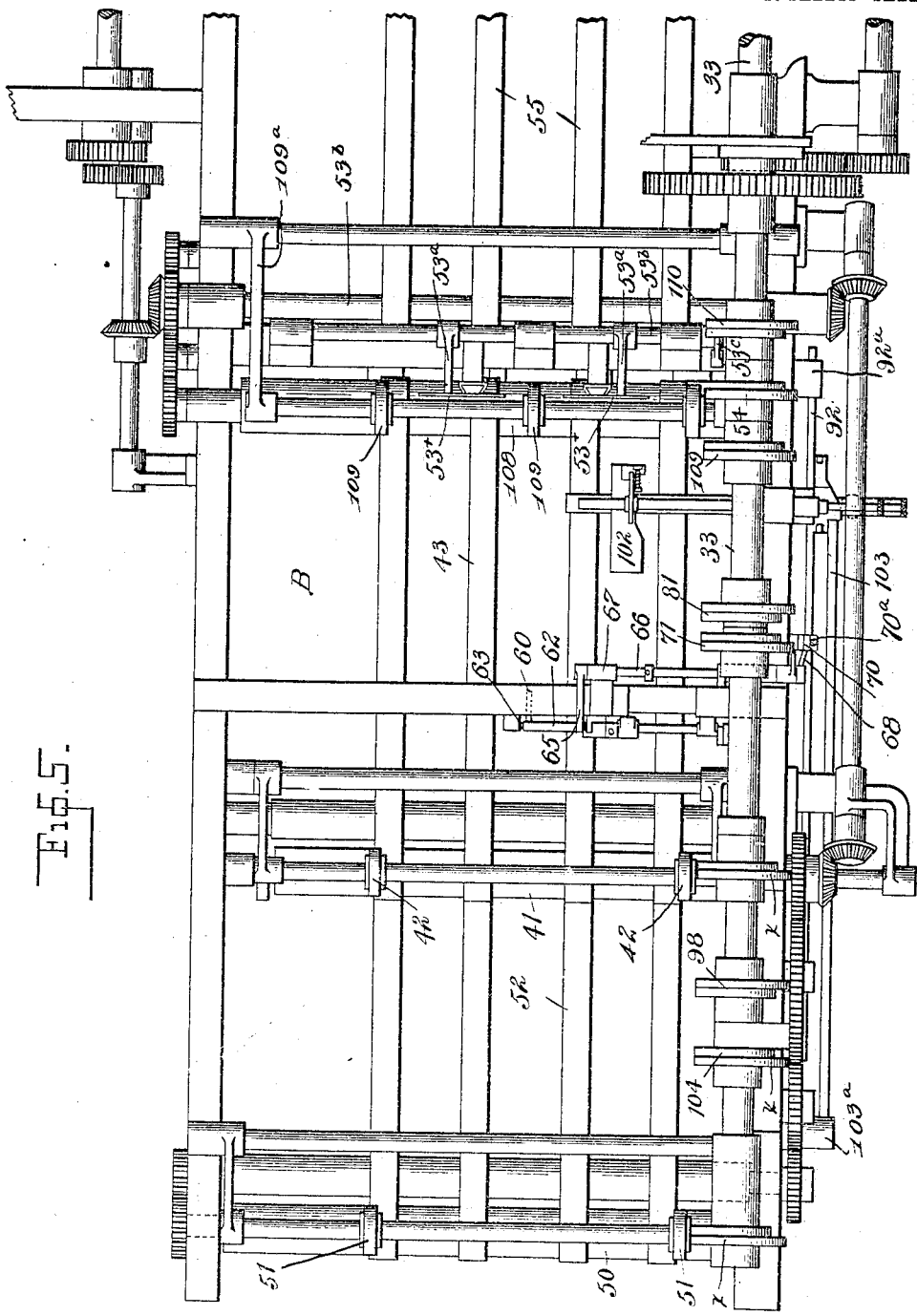

No. 787,838. PATENTED APR. 18, 1905.
T. C. DEXTER.
PAPER ASSEMBLING, STITCHING, AND FOLDING MACHINE.
APPLICATION FILED AUG. 5, 1902.
19 SHEETS—SHEET 6.
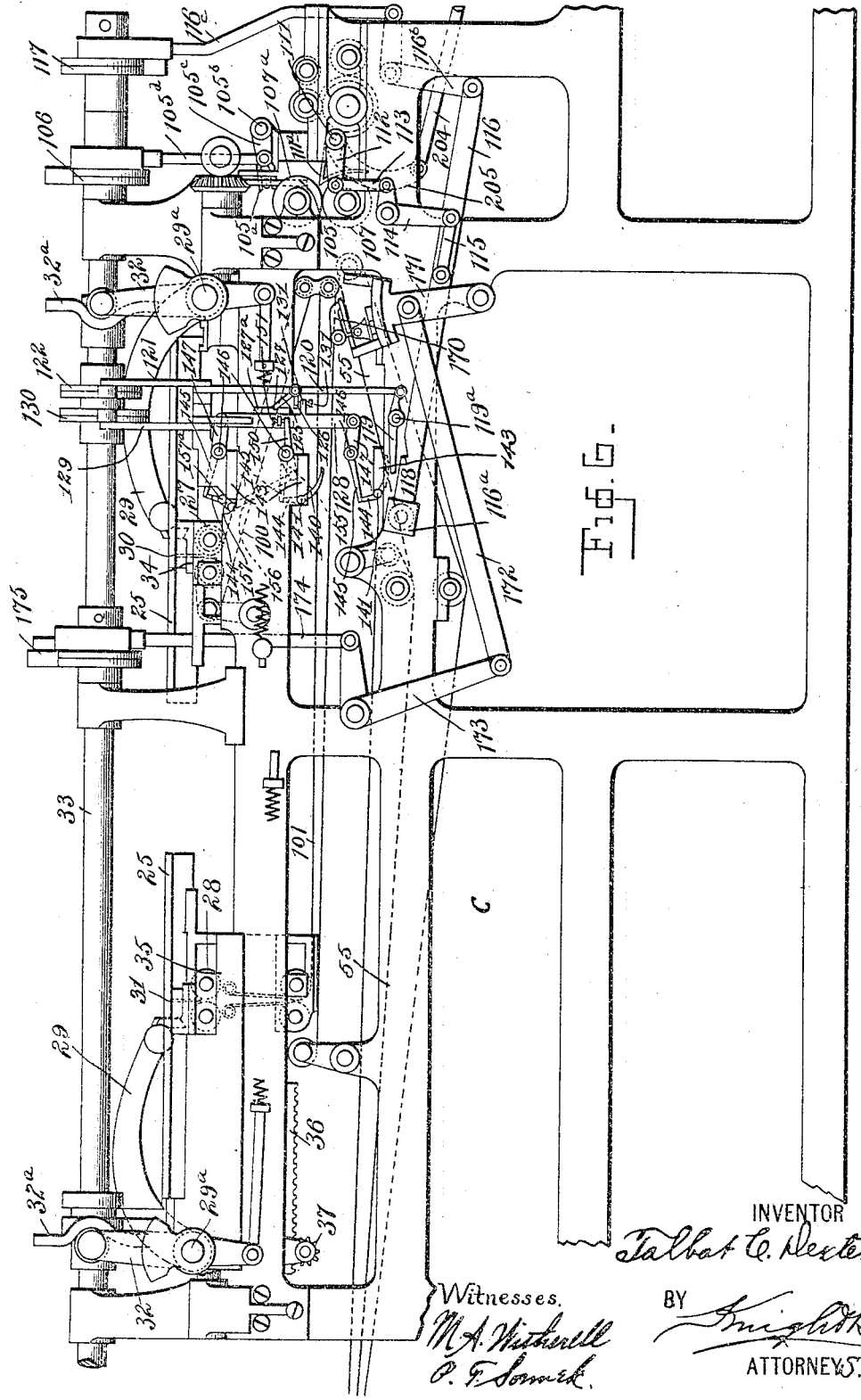

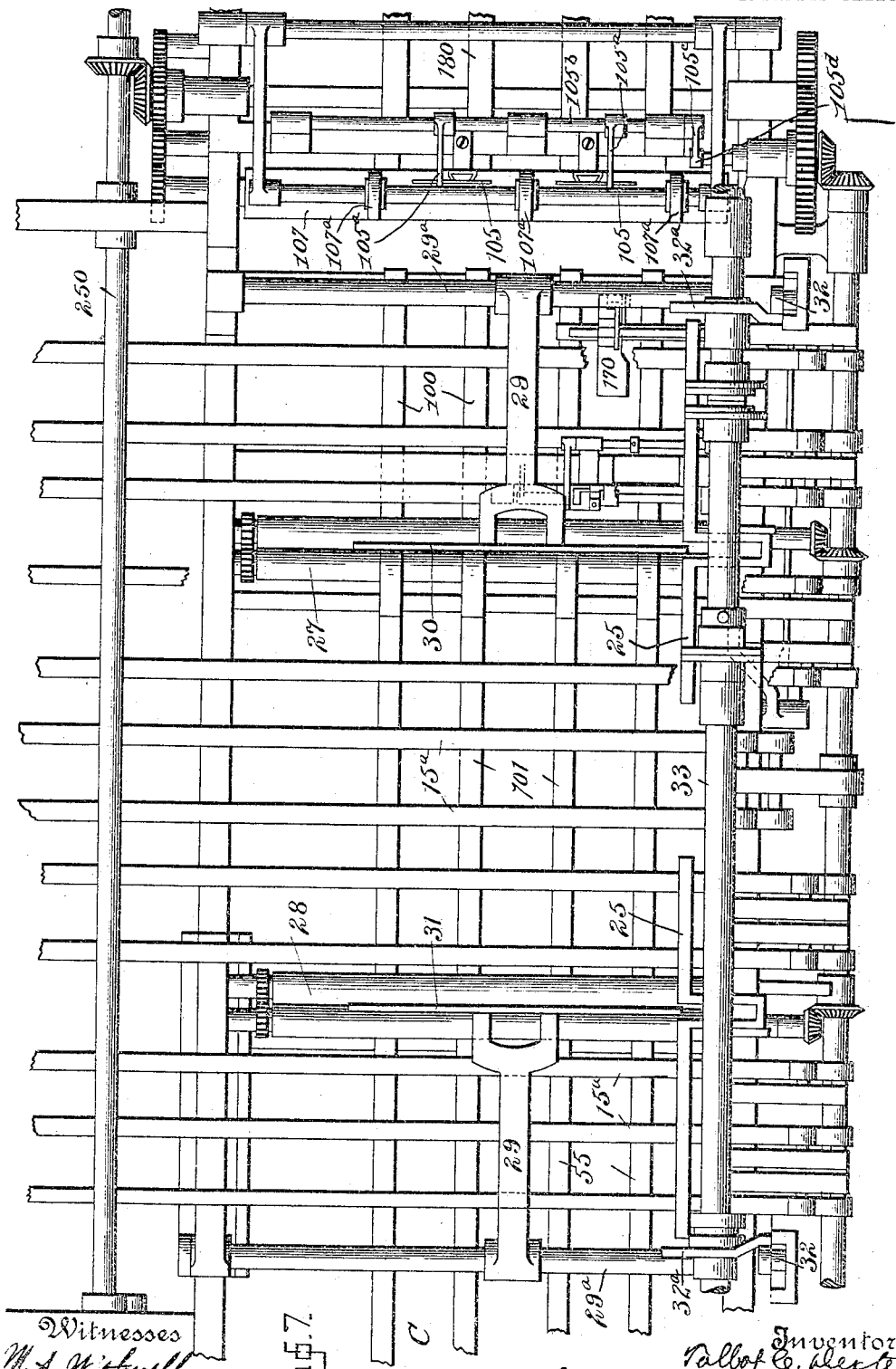

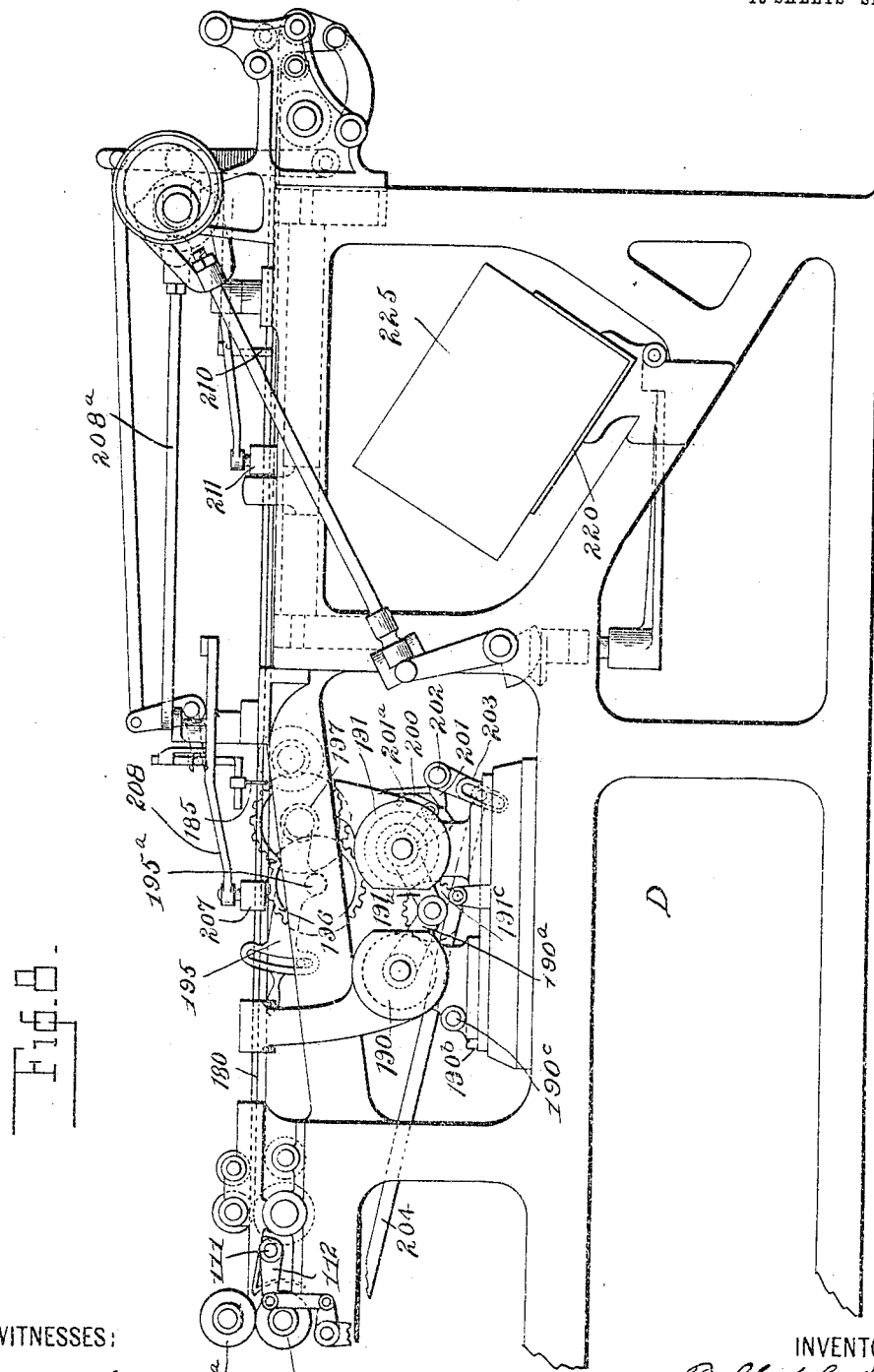

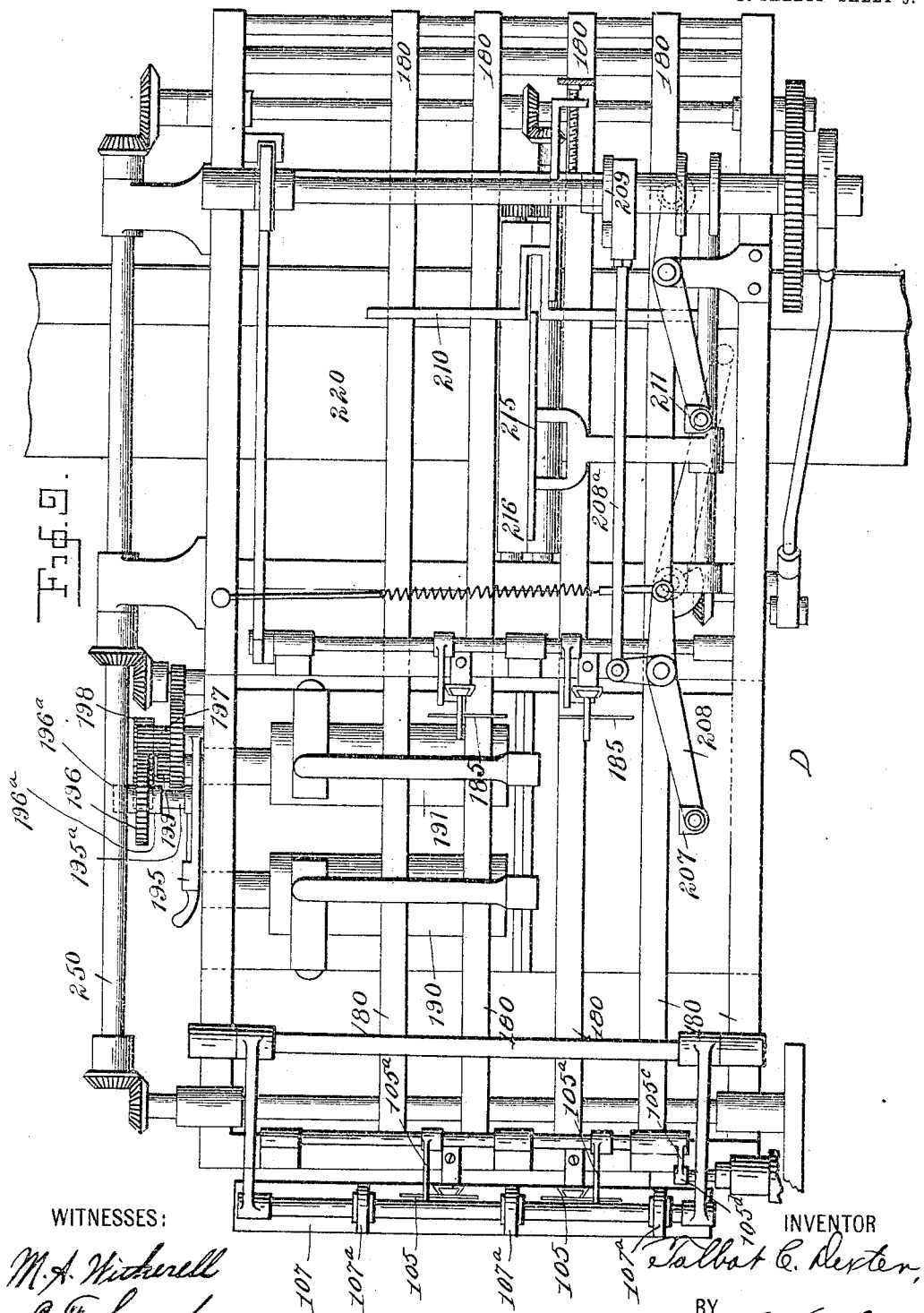

No. 787,838. PATENTED APR. 18, 1905.
T. C. DEXTER.
PAPER ASSEMBLING, STITCHING, AND FOLDING MACHINE.
APPLICATION FILED AUG. 5, 1902.
19 SHEETS—SHEET 10.
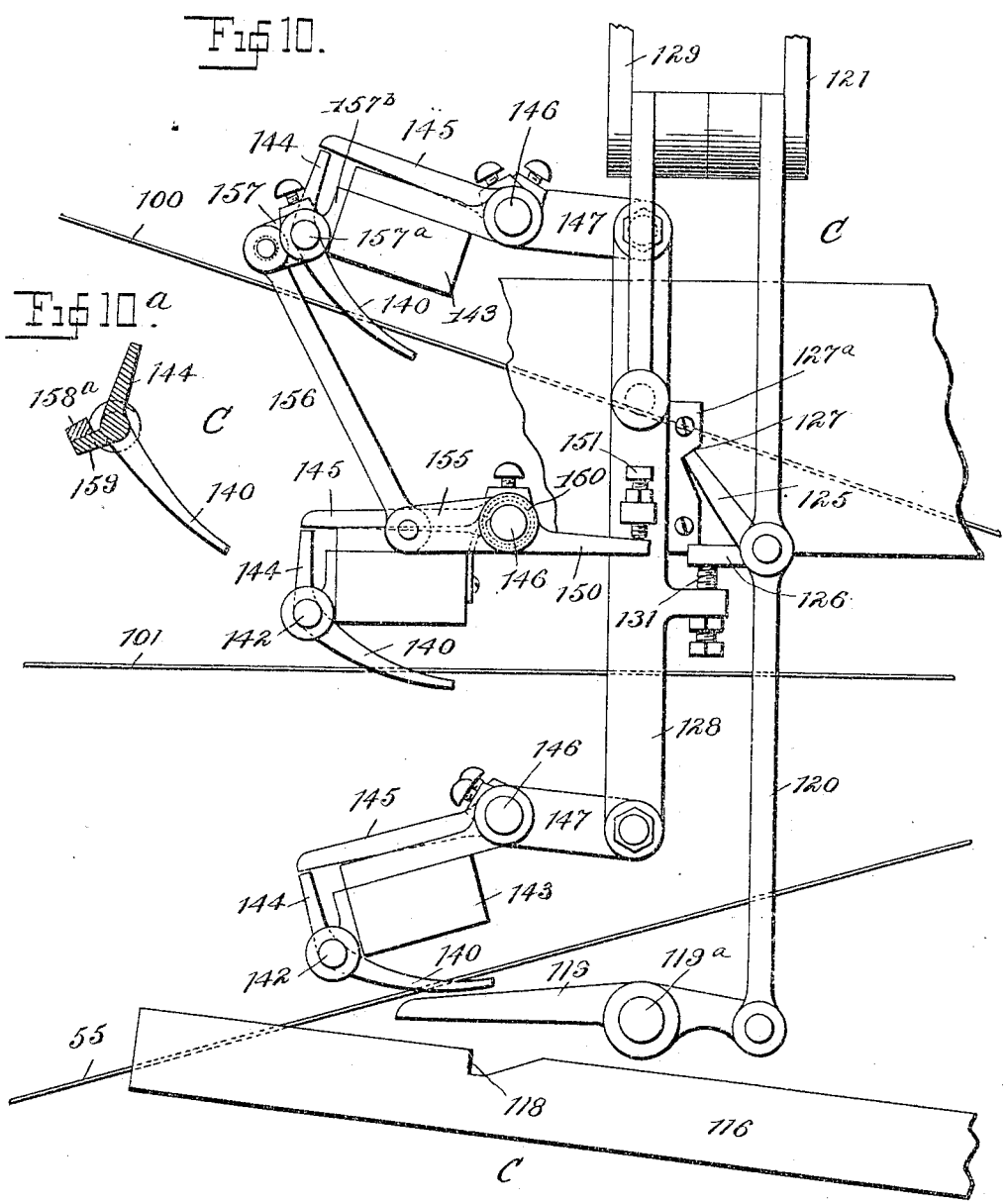

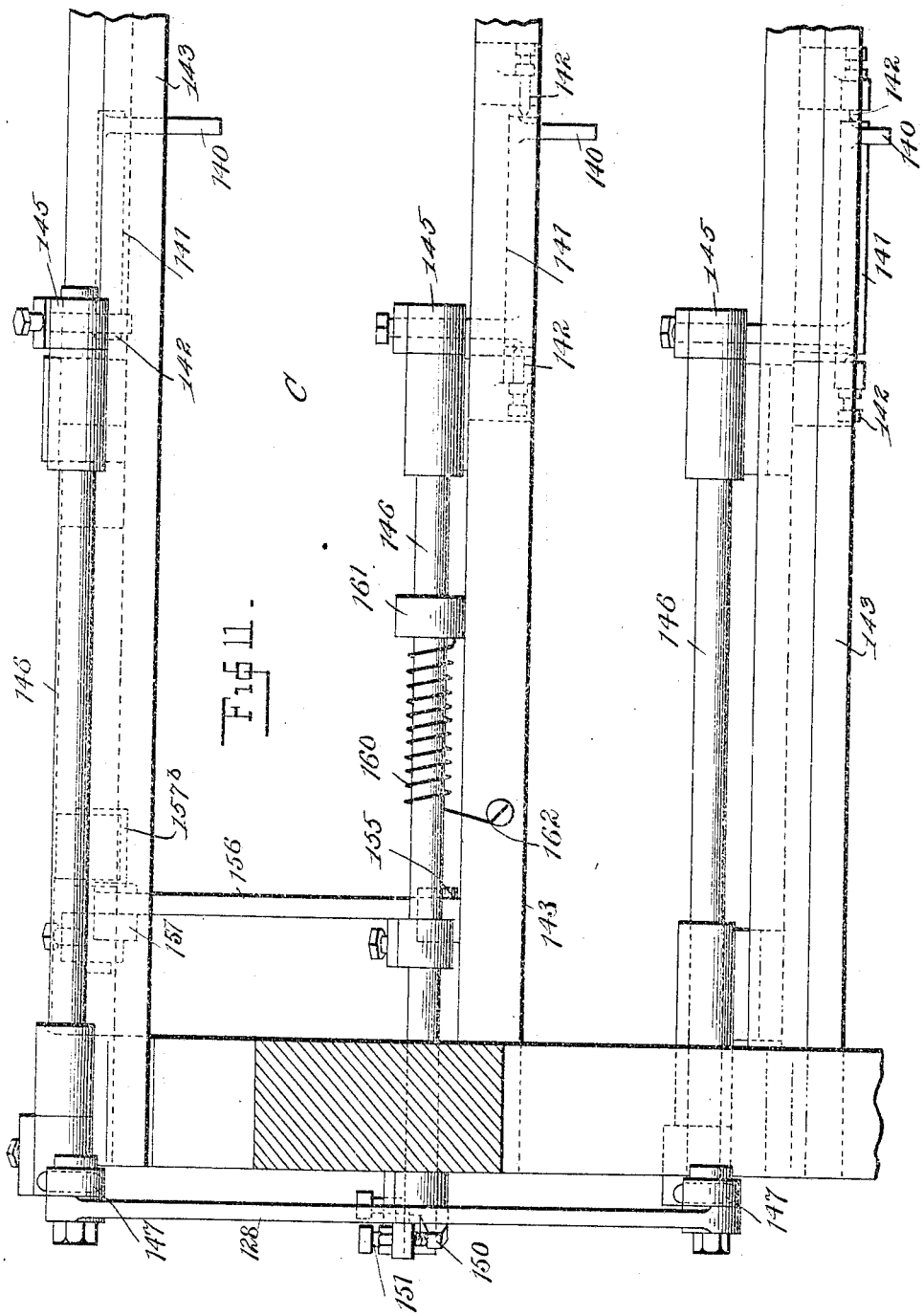

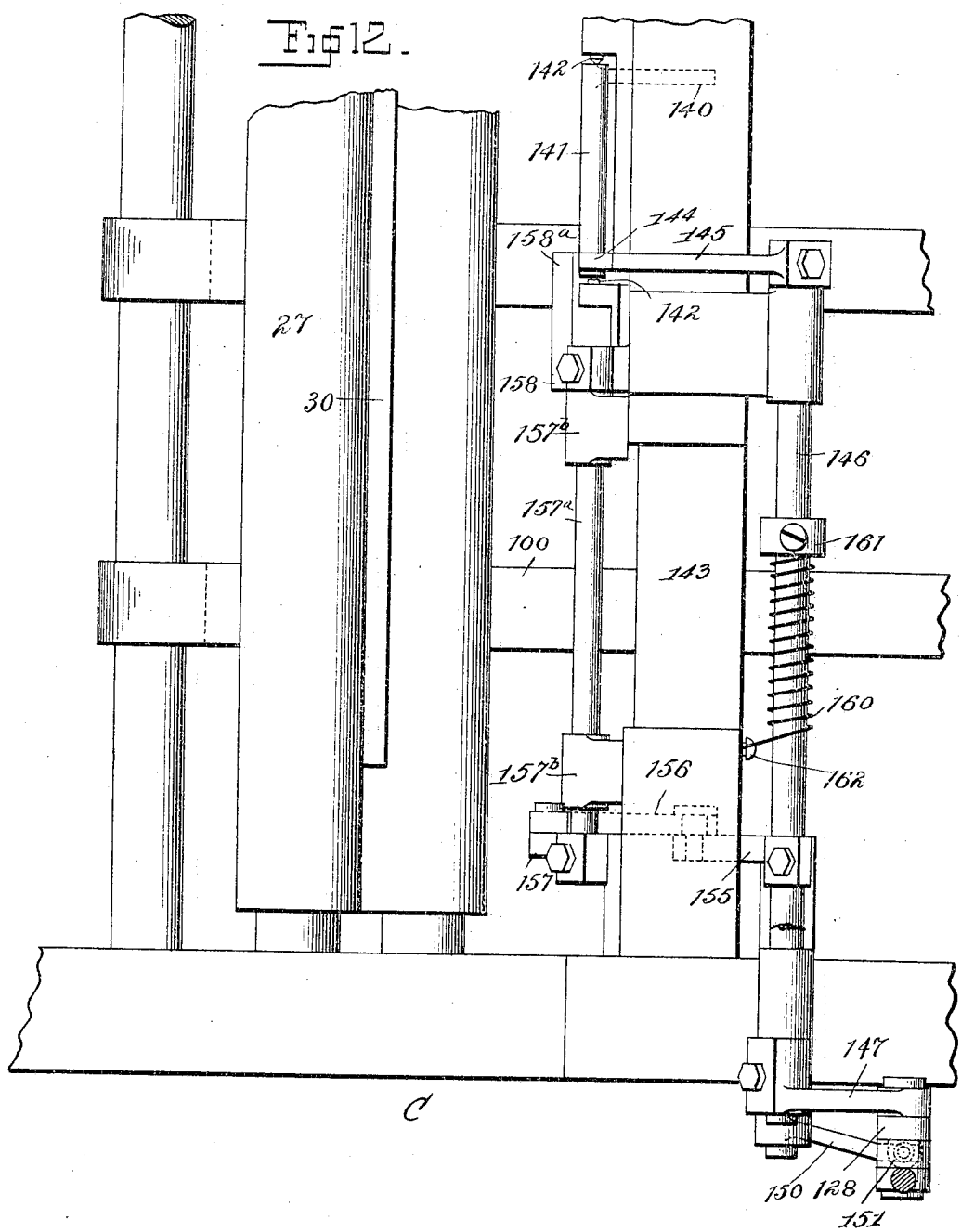

No. 787,838. PATENTED APR. 18, 1905.
T. C. DEXTER.
PAPER ASSEMBLING, STITCHING, AND FOLDING MACHINE.
APPLICATION FILED AUG. 5, 1902.
19 SHEETS—SHEET 13.
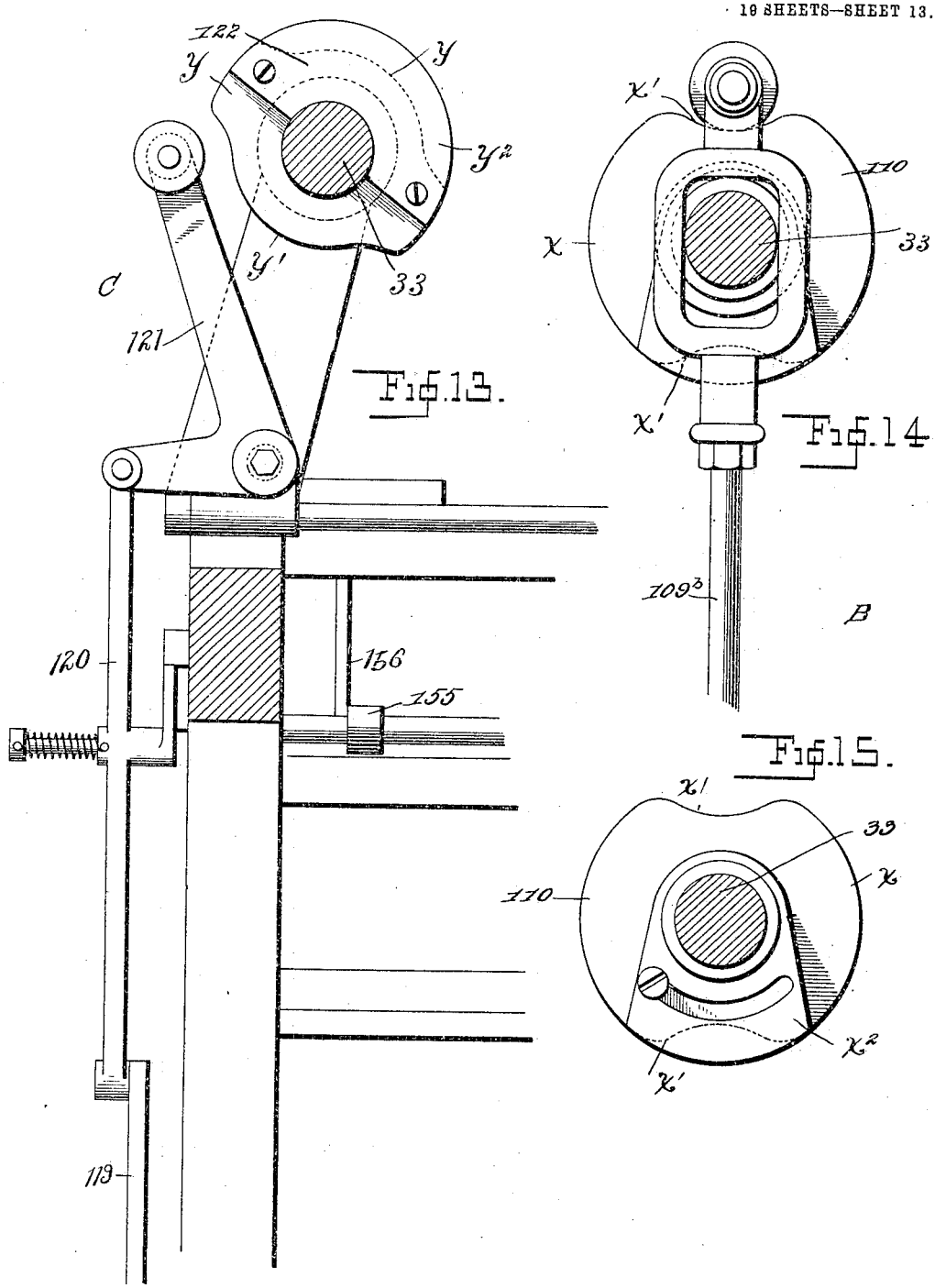

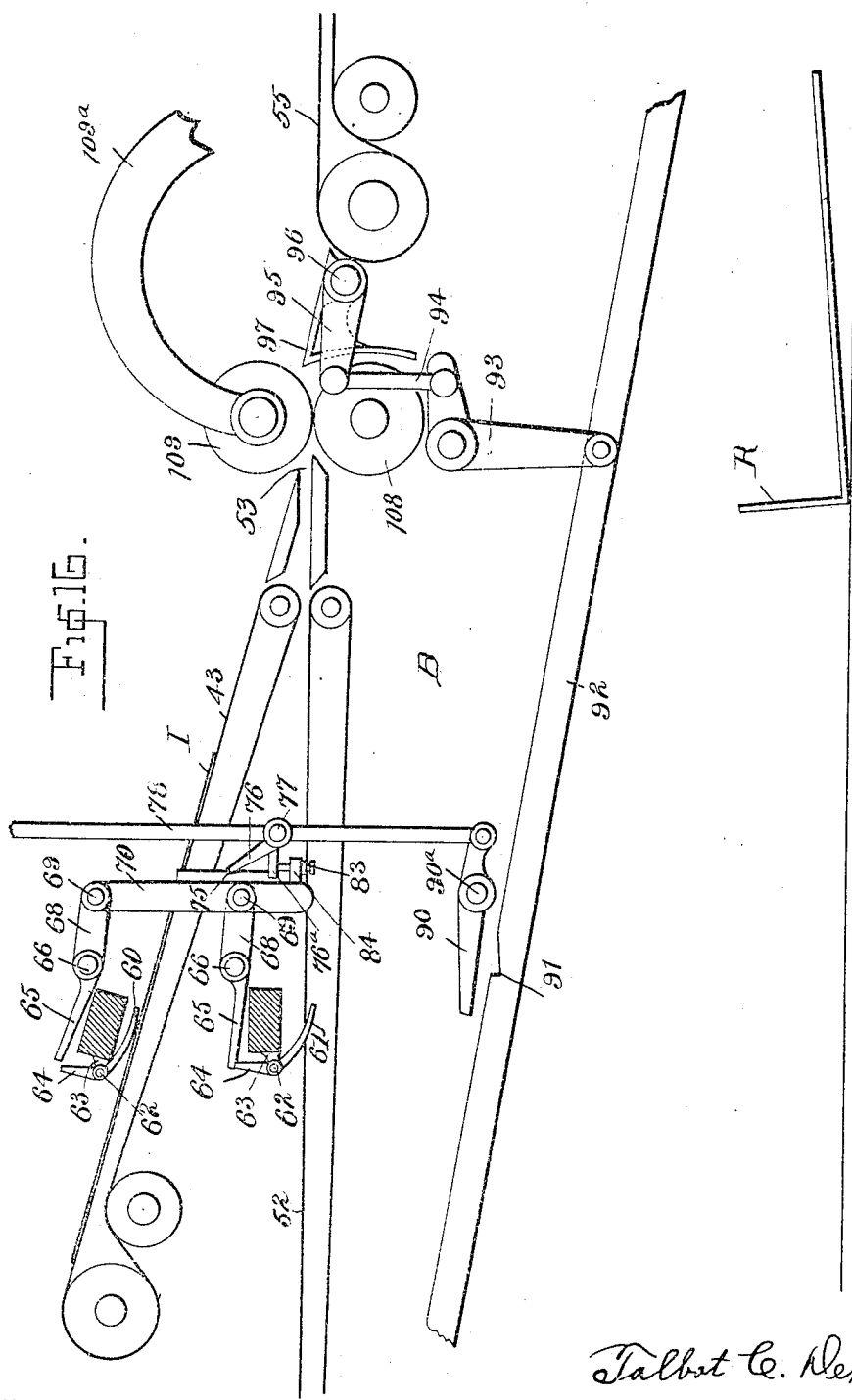

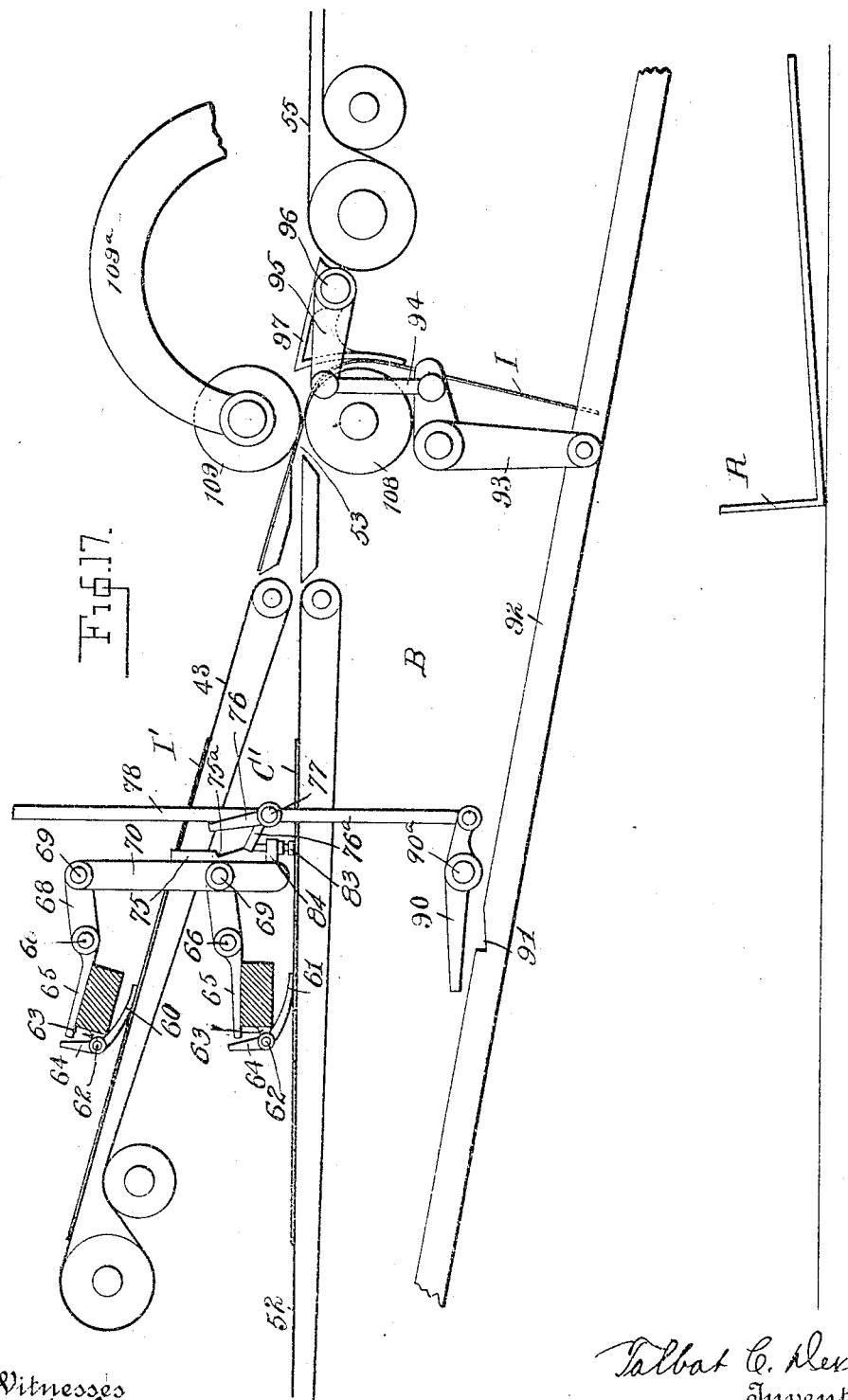

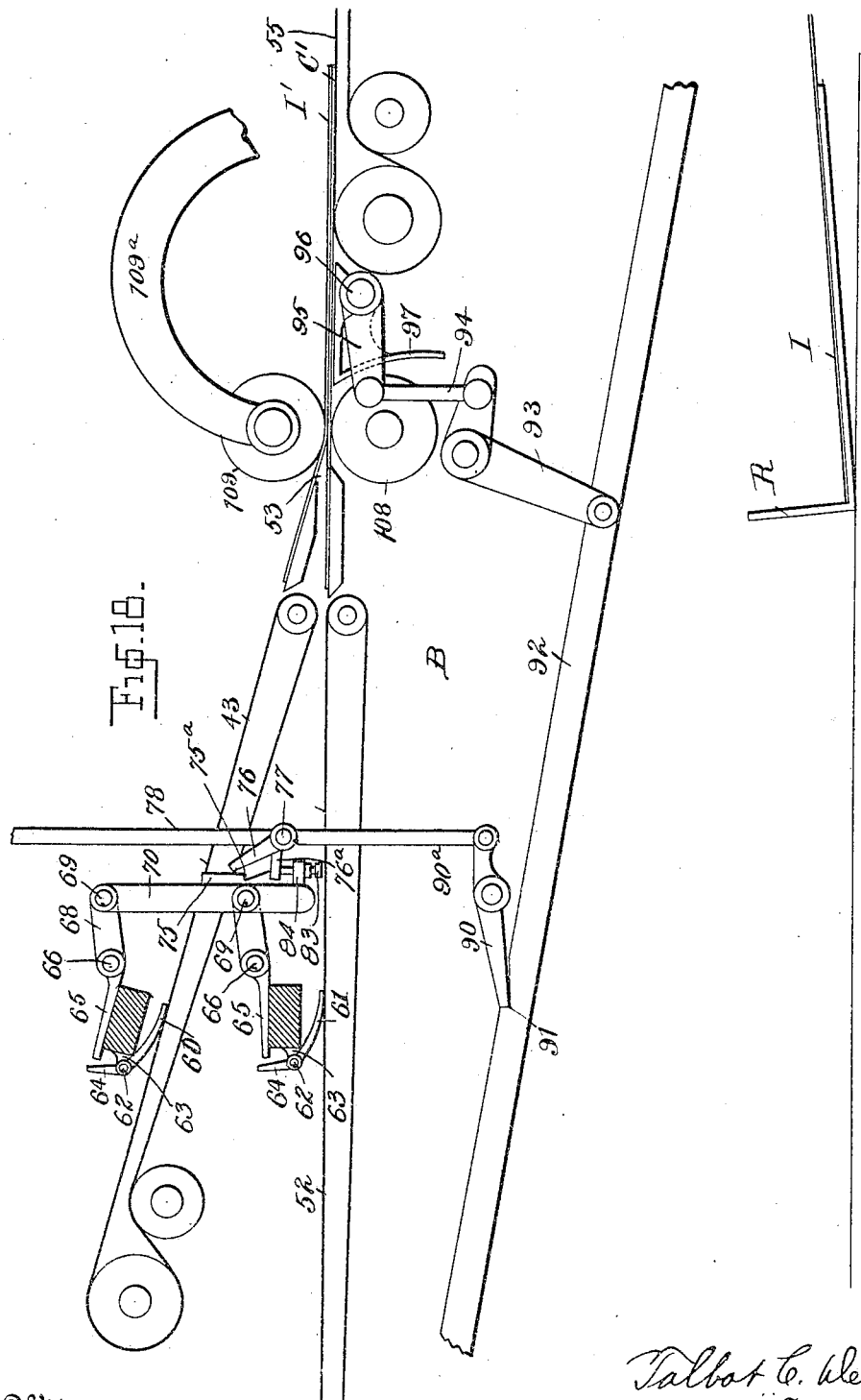

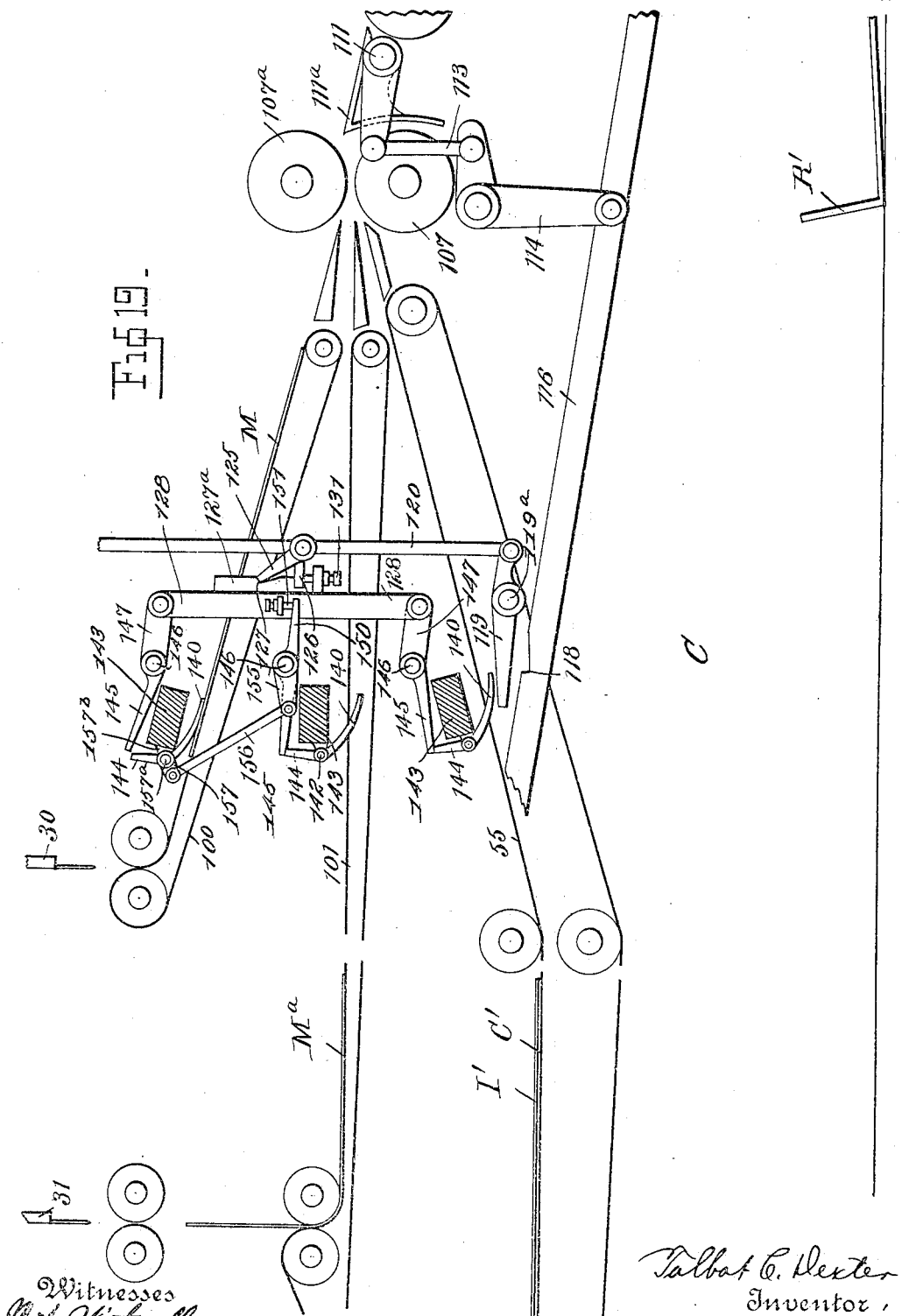

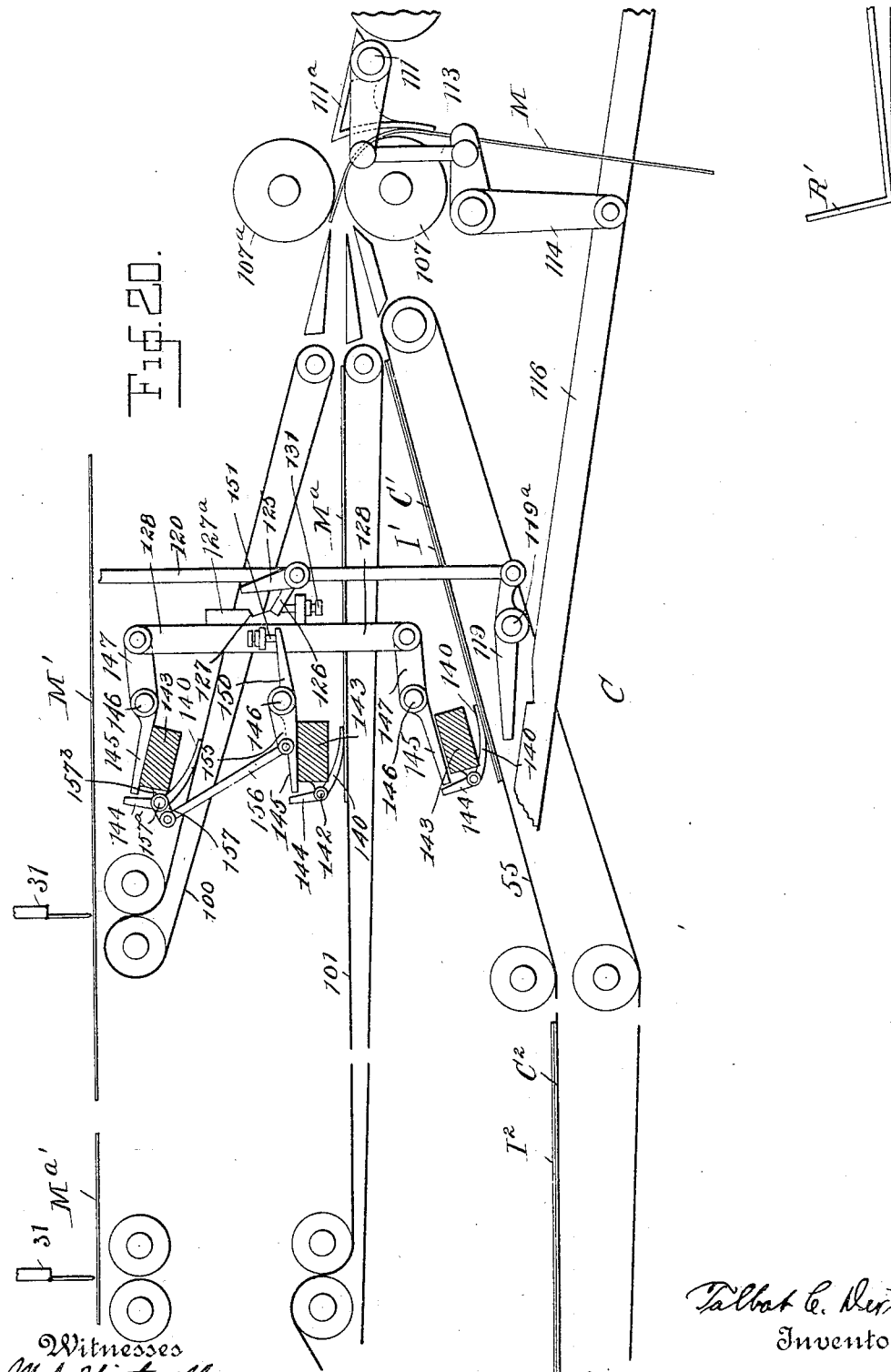

No. 787,838. PATENTED APR. 18, 1905.
T. C. DEXTER.
PAPER ASSEMBLING, STITCHING, AND FOLDING MACHINE.
APPLICATION FILED AUG. 5, 1902.
19 SHEETS—SHEET 19.
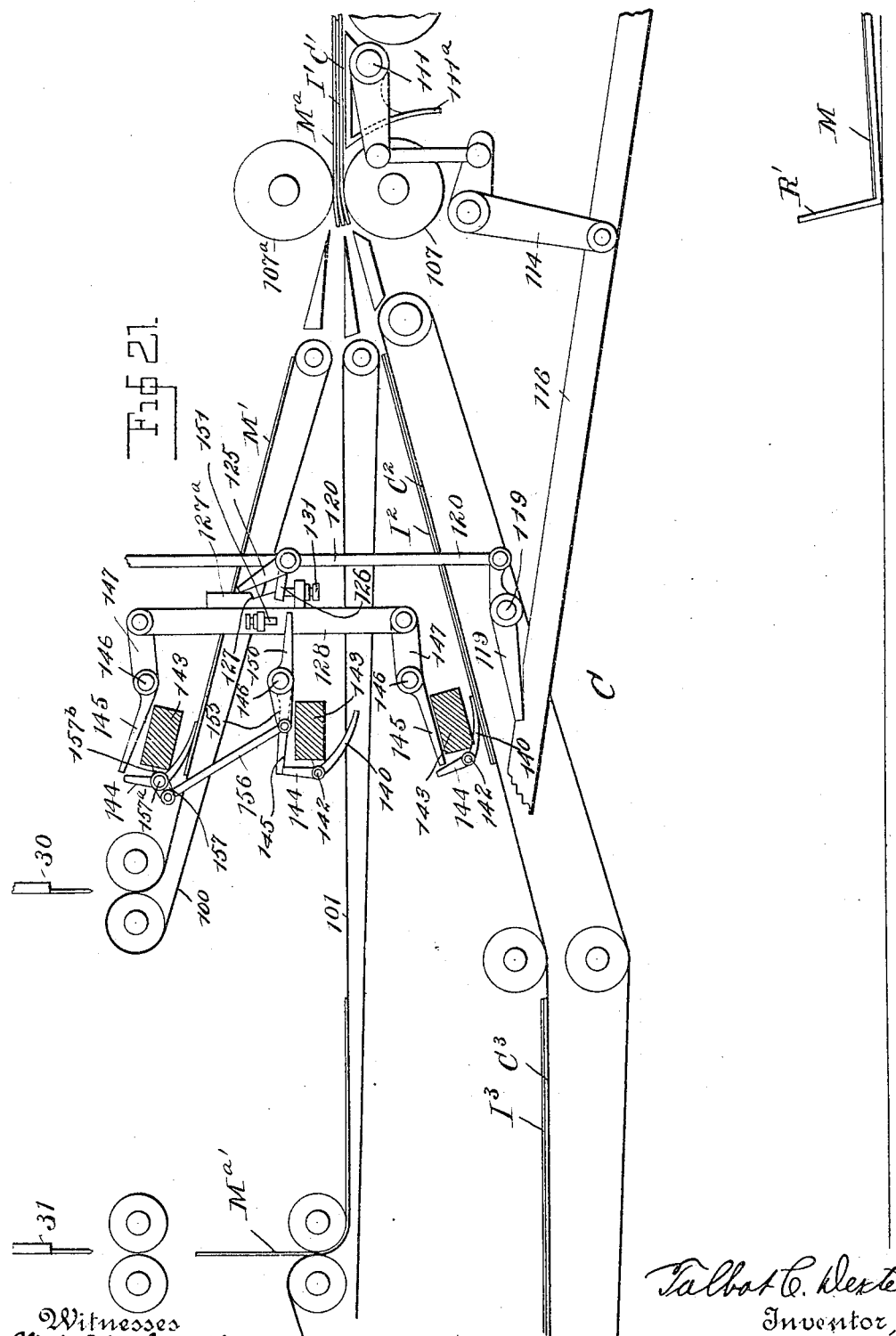

No. 787,838. Patented April 18, 1905.

UNITED STATES PATENT OFFICE.

TALBOT C. DEXTER, OF PEARL RIVER, NEW YORK, ASSIGNOR, BY MESNE ASSIGNMENTS, TO DEXTER FOLDER COMPANY, OF PEARL RIVER, NEW YORK, A CORPORATION OF NEW YORK.

PAPER ASSEMBLING, STITCHING, AND FOLDING MACHINE.

SPECIFICATION forming part of Letters Patent No. 787,838, dated April 18, 1905.

Application filed August 5, 1902. Serial No. 118,446.

*To all whom it may concern:*

Be it known that I, TALBOT C. DEXTER, a citizen of the United States, residing at Pearl River, in the county of Rockland and State of New York, have invented certain new and useful Improvements in Paper Assembling, Stitching, and Folding Machines, of which the following is a specification.

This invention relates to improvements in the class of machines designed to assemble, secure together, and fold a plurality of sheets constituting a periodical or pamphlet, and particularly to the style of machine covered by my previous patents, Nos. 588,635, 595,941, 599,319, 602,816, 618,648, 632,448, 653,196, and 669,724. In this type of machine as heretofore constructed and as disclosed in the patents mentioned the sheets or signatures and cover which are to be assembled, bound, and folded into a pamphlet are fed into the machine at a plurality of points and gathered or assembled at a single point of assemblage, and the sheet-actuated controlling devices are arranged in the paths of the individual sheets or signatures and cover to control the disposition of the assembled sheets or signatures and cover at the point of assemblage, the absence of any one of the parts of the pamphlet permitting the operation of the controlling devices for throwing out of the machine the remaining parts of the pamphlet which have been fed into position, so as to thereby avoid the binding, folding, and delivering of an incomplete book. With this type of machine as heretofore constructed three signatures or parts is about the largest number that can be handled practically because of the necessity of feeding each sheet or signature independently to the point of assemblage. The capacity of this old type of machine is therefore limited.

The main feature of novelty in my present invention consists in providing a plurality of sheet or signature assembling mechanisms which are so constructed and arranged that they will assemble sheets or signatures at a plurality of points, one of the points being the common point of assemblage at which all of the sheets or signatures of a book or pamphlet are collected preparatory to being passed to the stitching mechanism. Suitable controlling devices are provided whereby the sheets or signatures assembled at one point will control the disposition of the sheets or signatures assembled at another point, and preferably the sheets or signatures which are first assembled will control the disposition of the sheets or signatures which are subsequently assembled.

In a machine constructed in accordance with my present invention the sheets or signatures and cover which are to constitute the book or pamphlet to be produced are fed in at a number of convenient points and are conveyed by subauxiliary conveyers to auxiliary conveyers on which they are assembled in twos or threes and the assembled parts then conveyed by the auxiliary conveyers to a main conveyer, upon which the several sheets or signatures and collections of previously-assembled sheets or signatures are assembled as a whole and transferred to the stapling or stitching machine and the final-folding and delivering mechanisms. This novel form of machine also includes automatic sheet or signature controlling devices for the auxiliary conveyers actuated by the individual sheets or signatures carried by the subauxiliary conveyers, so that the absence of any individual sheet or signature at the point of first assemblage on an auxiliary conveyer will permit a device to be operated to throw out of the machine the remaining sheets or signatures which have reached the auxiliary conveyer. In addition to the auxiliary controlling devices I provide the main automatic controlling devices which are actuated by the sheets or signatures or collections of sheets or signatures carried forward on the auxiliary conveyers and control the main-sheet-deflecting switch and stitching-machines, so that the absence of any sheet or signature or any collection of sheets or signatures which should have been carried forward by the auxiliary conveyers will permit the main-sheet-deflecting switch to throw out of the machine the sheets or collections of sheets which arrive at the common point of assemblage on the main conveyer and arrest the operation of the stitching-machines at the time when the imperfect book or pamphlet would have arrived at the point of stitching if it had not been switched out of the machine.

In my improved machine it will be clear that I can assemble and convey forward a plurality of signatures or parts on one or more of the auxiliary conveyers and convey forward a single signature or part on another one or more of the auxiliary conveyers and assemble the collection (or collections) of signatures or parts with the single signatures or parts at the point of common assemblage on the main conveyer. When the machine is operating in this manner, the absence of the required single signature or part from one of the auxiliary conveyers will permit the main-sheet-deflecting switch to throw out of the machine the remaining parts or collection of parts and arrest the operation of the stitching-machine in the same way that the absence of a required collection of parts would permit said action.

Another novel feature of great importance in my improved machine is the structure of the main-sheet-actuated controlling mechanism which provides for the production of one large book or pamphlet at every complete revolution of the machine or two small books or pamphlets at every revolution. The form of machine shown in the drawings is capable of producing a single thirty-six-page book, including cover, at every revolution, or two twenty-page books, including covers, at every revolution. In producing this result the second-fold mechanisms are adjustable so as to be able to deliver the two sections of the main sheet upon the auxiliary conveyers simultaneously when producing the large books or pamphlets, and at proper intervals apart, when producing the small books or pamphlets, the side-registering mechanism and main-sheet-controlling mechanism must be adjustable to operate once or twice during each revolution to suit the size of book being produced, and the sheet-actuated tripping devices for the auxiliary conveyers must be so constructed that the presence of either one of the main-sheet sections, including the cover and insert-sheets upon the auxiliary conveyers, will prevent the operation of the main-sheet-deflecting switch and allow the stitchers to operate. To cause the sheet-actuated tripping devices of the main controlling mechanism to operate in this manner, I arrange the tripping-finger of one of the main-sheet sections to control a lever having a positive connection with the main controlling-bar and the tripping-finger of the other main-sheet section to control a lever which is not connected with the main controlling-bar, but which has a loose joint connection with the tripping-finger of the first-named main-sheet section for actuating it, (so that the two tripping-fingers of the main-sheet sections have but a single connection with the main controlling-bar, which connection is operated by either of said tripping-fingers,) and the tripping-finger for the previously-assembled insert and cover sheets has a positive connection with said main controlling-bar.

In order that my invention may be fully understood, I will first describe the same with reference to the accompanying drawings and afterward point out the novelty with more particularity in the annexed claims. The drawings represent a machine having only two points of assemblage of sheets or signatures, one being the point of common assemblage on the main conveyer and the other being an auxiliary point of assemblage on one of the auxiliary conveyers which receives individual parts or signatures from two subauxiliary conveyers. It will be clear, however, that a machine can be constructed within the scope of my present invention with a larger number of points of assemblage and each point of assemblage can collect two or three signatures or parts. For instance, I can arrange two or three subauxiliary conveyers leading to a point of assemblage on each of the auxiliary conveyers which convey the several collections of sheets or signatures to the main conveyer, and in cases where a larger number of parts or signatures are to be bound than can be taken care of by this suggested arrangement the plan of my invention can be still further expanded by arranging to assemble a plurality of signatures or parts on one or more of the subauxiliary conveyers to be carried thereby as single parts to the auxiliary conveyers.

In any of the suggested embodiments of my invention it will of course be understood that the sheet-controlling devices will be so arranged on the principle above suggested and hereinafter explained in detail that the absence of any individual signature or part of the book or pamphlet at any point in the machine will permit the sheet-controlling and stitcher-throw-out devices to operate to throw out all other parts of the incomplete book or pamphlet and prevent the operation of the stitching-machine when the incomplete book is due to arrive in position to be stitched.

Figure 2:
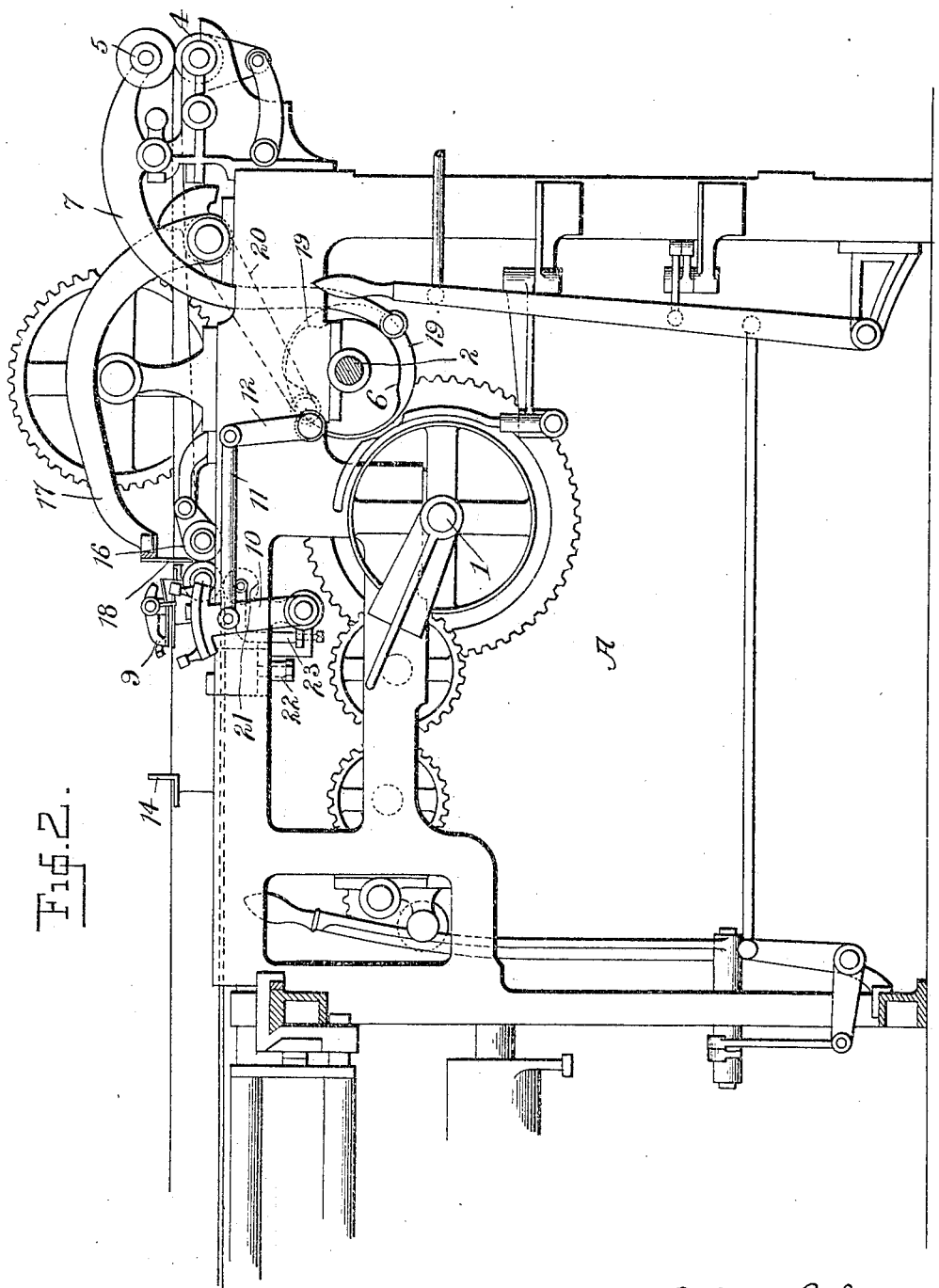
Figure 3:
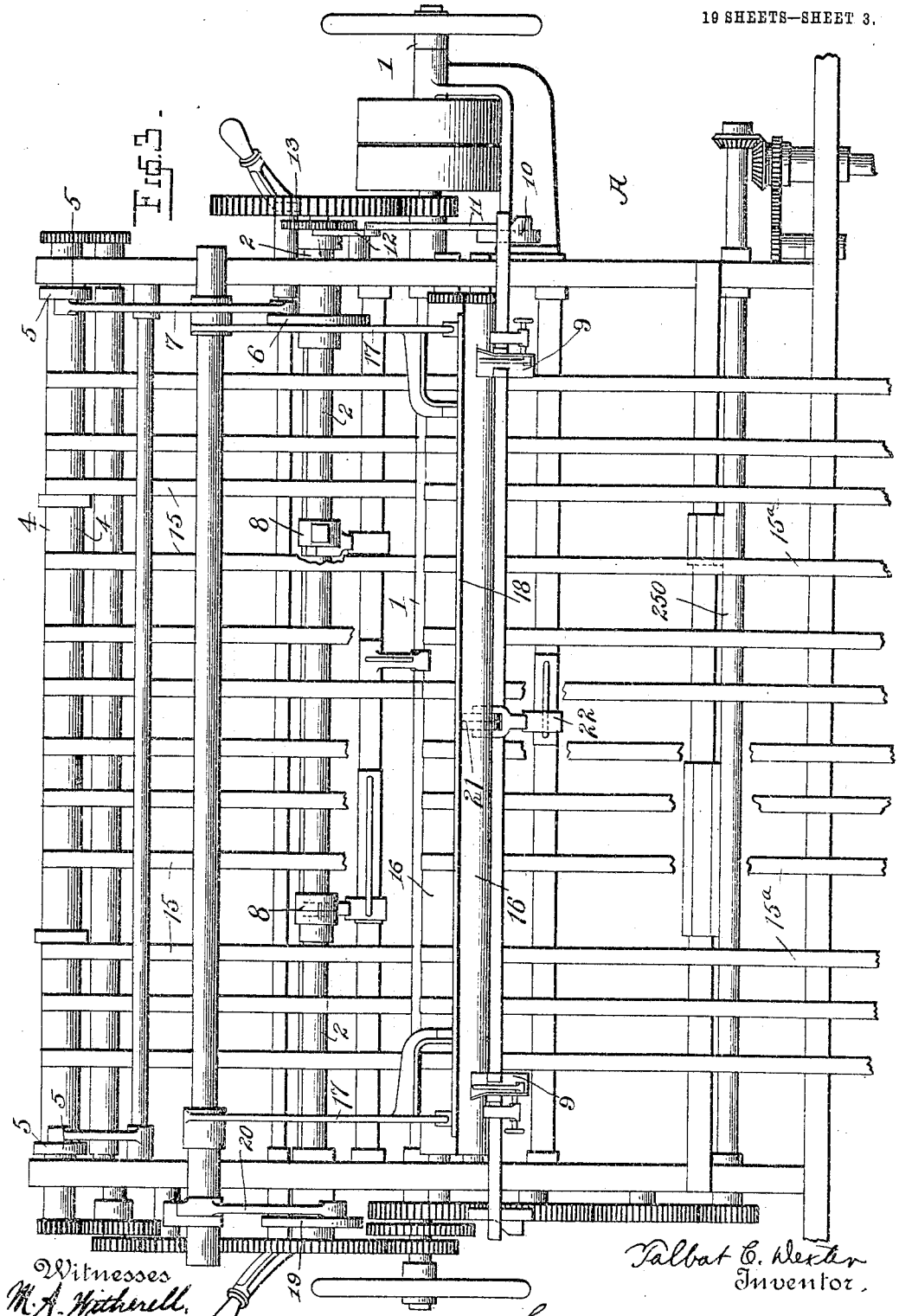
Figure 4:
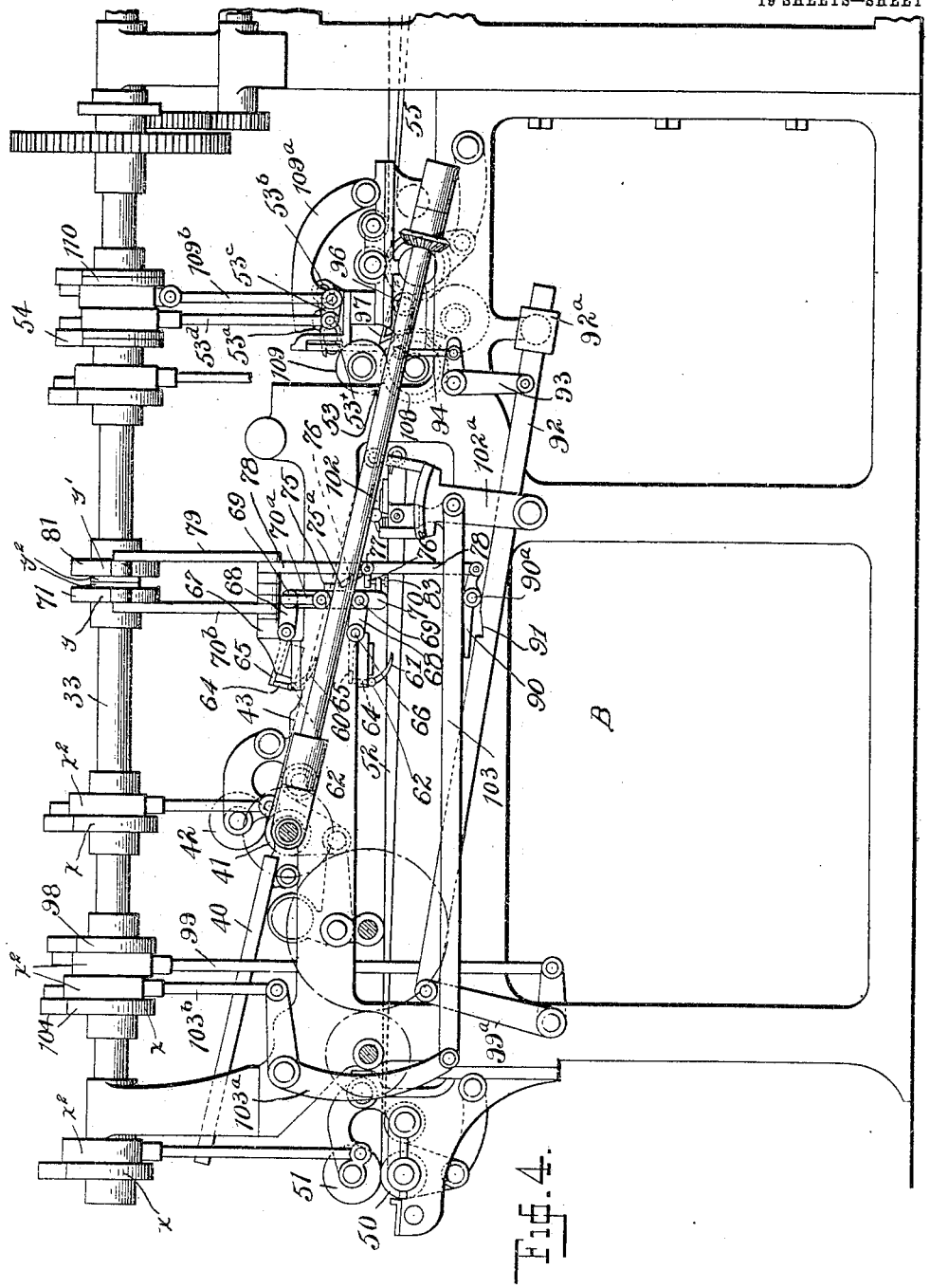

In said drawings, Figure 1 is a diagrammatic plan view of my improved assembling, stitching, and folding machine, illustrating its general arrangement and construction. Fig. 1ª is a diagrammatic sectional side elevation of the conveyers, stops, and switches. Fig. 2 is a side elevation of section A of the machine shown in Fig. 1, into which the main sheets are fed by hand or by an automatic feeding-machine. Fig. 3 is a plan view of the same. Fig. 4 is a side elevation of section B of the machine, into which the insert and cover sheets are fed. Fig. 5 is a plan view of the same. Fig. 6 is a side elevation of central section C of the machine, including the second-fold mechanisms and the main automatically-operated sheet-controlling devices. Fig. 7 is a plan view of the same. Fig. 8 is a side elevation of section D of the machine, illustrating the stitching or stapling machines and the final-fold and delivery mechanisms. Fig. 9 is a plan view of the same. Fig. 10 is an enlarged detail side elevation of the main-sheet-actuated tripping devices of section C for controlling the operation of the main switch and the stapling-machines. Fig. 10ᵃ is a detail view of part of the same. Fig. 11 is an elevation of a portion of the same looking toward the feed-in end of the machine, part of the machine-frame being shown in transverse section. Fig. 12 is a detail plan view of the same mechanism. Fig. 13 is a detail sectional view illustrating part of the automatic operating mechanism for the sheet-controlling devices. Figs. 14 and 15 are detail elevations of the operating-cam of section B, showing another part of the same mechanism. Figs. 16, 17, and 18 are diagrammatic side elevations of the sheet-actuated tripping devices of section B and the auxiliary switch for controlling the disposition of the insert and cover sheets. Figs. 19, 20, and 21 are diagrammatic side elevations of the main-sheet-actuated controlling devices of section C and the main-sheet-deflecting switch for determining the disposition of incomplete parts of the books or pamphlets.

My improved machine, like the machines of my prior patents hereinbefore referred to, comprises a main sheet-conveyer for carrying assembled sheets or signatures to the stapling or stitching machines and final-fold and delivery mechanisms, auxiliary sheet-conveyers, preferably three in number, for conveying individual sheets or signatures to the point of common assemblage on the main sheet-conveyer, sheet-actuated controlling means, and means for feeding into the machine at convenient points the several parts or signatures which are to be bound into the book or pamphlet. In addition to these features in common with the old form of machine my present invention includes subauxiliary conveyers leading to the auxiliary conveyers and auxiliary points of assemblage on the auxiliary conveyers for collecting two or more parts that are to be forwarded to the main point of assemblage. In this improved machine the sheets which are collected at the auxiliary point of assemblage are automatically controlled by sheet-actuated tripping devices, so that an incomplete number of parts will be switched out of the machine at the auxiliary point of assemblage.

For convenience of description I will refer to the machine in four sections, A, B, C, and D, as illustrated in Fig. 1 of the drawings.

Section A of the machine, Figs. 1, 2, and 3, consists of an automatic folder adapted to receive large sheets of paper from an automatic feeding-machine or from a feed-board fed by hand and fold the sheets once longitudinally and then cut them into two folded sections, which are passed by suitable conveying-tapes into one side of the central section C of the machine to the duplicate second-fold mechanism, as hereinafter explained. 1 is the main driving-shaft; 2, the cam-shaft; 4, the main feed-roller, and 5 the usual drop-rollers, operating above and in conjunction with the feed-roller 4. Drop-rollers 5 are operated by cam 6 and arm 7, as usual. 8 is a rotary slow-down device for preventing the rebound of the sheet from the gage. 9 is the side-registering gripper, of usual construction, operated through connections 10, 11, and 12, and cam 13. 14, Fig. 2, is the receding first-fold gage, operated in the usual manner. 16 represents the first-fold rollers, and 18 is the folding blade or knife, mounted on arms 17 and operated by cam 19 and cam-arm 20. 21 is the rotary cutter for separating the sheet into two equal parts as it passes through the first-fold rollers 16 and is adjustable parallel with the first-fold rollers 16 to cut the once-folded sheet of any size into halves. 22 and 23 are brackets supporting the cutter, so that it may be adjusted vertically as well as horizontally. 15 represents the feeding-in tapes, and 15ᵃ the tapes which transfer the two sections of the once-folded sheet from the first-fold mechanism to the second-fold mechanisms in the central section C of the main machine, Figs. 1, 6, and 7. The two sections M and Mᵃ, Figs. 19, 20, and 21, of the main sheet are carried by the tapes 15ᵃ over the second-fold rollers 27 and 28 until said sheets are arrested by the second-fold gages 25. The second-fold rollers 27 and 28 are mounted in frames 34 and 35, the frame 34 being stationary, while the frame 35 is adjustable, it having a rack-bar 36, engaged by a pinion 37, by which folding-rollers 28 may be adjusted toward and away from the folding-rollers 27. These adjustments are for the purpose of accommodating sheets of different sizes. 30 and 31 are the second-fold blades or knives, mounted upon rock-arms 29, extending from rock-shafts 29ᵃ and operated, through arms 32, by cams 31, mounted upon cam-shaft 33. The sections of the main sheet are passed through the second-fold mechanism just referred to and are conveyed by the sets of tapes forming the first and second auxiliary sheet-conveyers 100 and 101, which lead to the point of common assemblage 105 on the main conveyer 180, hereinafter referred to.

Referring now to section B of the machine, Figs. 1, 4, and 5, 40 is a feed-board, 41 a lower feed-roller, 42 drop-rollers, and 43 a set of tapes constituting the upper one of the two subauxiliary sheet-conveyers. It is intended that insert-sheets be fed by hand from feed-board 40 to feed-rollers 41 and 42. 50 is another lower feed-roller, 51 drop-rollers, and 52 a second set of tapes constituting the second or lower subauxiliary sheet-conveyer. It is intended that cover-sheets be fed from an automatic feeding-machine to the feed-rollers 50 and 51. These subauxiliary conveyers 43 and 52, Figs. 4, 5, 16, 17, and 18, lead to a common point 53 on the third and lowest auxiliary conveyer 55 for the purpose of assembling an insert-sheet with a cover-sheet at this point. Supported in the path of the subauxiliary conveyers 43 and 52 are the sheet-actuated tripping-fingers 60 and 61, respectively, each of which is mounted upon a rock-shaft 62, freely journaled in the brackets 63 and formed with an upwardly-projecting heel 64, supported in the plane of a rock-arm 65, mounted upon a rock-shaft 66, which is journaled in brackets 67 and carries a forwardly-extending arm 68, connected at 69 with a vertically-movable controlling-bar 70. This bar 70 is operated vertically through link $70^a$ and bell-crank lever $70^b$ by a cam 71, keyed to the cam-shaft 33. Mounted upon the machine-frame adjacent to the auxiliary controlling-bar 70 is a bracket block or plate 75, formed with a notch $75^a$, in which is adapted to engage a dog 76, journaled at 77 to a vertically-movable bar 78, operated through bell-crank 79 by a cam 81 on shaft 33. The dog 76 is formed with a heel $76^a$, which projects over into the path of an adjustable screw-tappet 83, mounted in bracket 84 on the bar 70. Pivotally connected to the lower end of the bar 78 is a dog or pawl 90, which is journaled at $90^a$ and adapted to engage a notch 91, formed in the reciprocating operating-bar 92, sliding in swiveled guide $92^a$ and connected, through bell-crank lever 93, link 94, and rock-arm 95, with rock-shaft 96, carrying a series of sheet-deflecting fingers constituting the auxiliary switch 97. The switch 97 is located adjacent to the point of assemblage on the auxiliary conveyer 55. The reciprocating bar 92 is operated by cam 98 on shaft 33, link 99, and bell-crank $99^a$. The result of this construction is the same as in my previous patents above referred to—namely, that in case either the insert or cover section fails to raise the tripping-finger supported in its path bar 70 will be held against movement by arms 65, which are engaged by heels 64, and as bar 70 does not move the dog 76 will remain in engagement with notch $75^a$ of bracket 75 and prevent the bar 78 from moving upwardly, so that the pawl 90 will be held out of engagement with the operating-bar 92 and said bar 92 will be free to move forwardly to push the switch 97 into its operative position to cause the switching-out of the part or section which has passed forward to the point of assemblage on the third or lowest auxiliary conveyer 55. R is a receptacle beneath the machine, Figs. 16, 17, and 18, to receive the switched-out cover and insert sheets. 102 is a side-registering gripper, Figs. 4 and 5, mounted upon the machine-frame in position to grip the cover-sheet on the subauxiliary conveyer 52 just as it reaches auxiliary point of assemblage at gage 53 and register it laterally in the machine. This side-registering gripper is operated by rock-arm $102^a$, link 103, bell-crank lever $103^a$, link $103^b$, and cam 104 on cam-shaft 33. $53^×$ is the auxiliary gage at the leading-in end of auxiliary conveyer 55. Gage $53^×$ is vertically movable in the usual guides and is operated by rock-arms $53^a$, mounted on rock-shaft $53^b$, actuated by rock-arm $53^c$, link $53^d$, and cam 54 on cam-shaft 33. 108 is the lower feed-roller, and 109 the coöperating drop-rollers for starting forward on auxiliary conveyer 55 the assembled cover and insert sheet after they have been arrested by gage $53^×$. Drop-rollers 109 are journaled upon a shaft carried in rock-arms $109^a$ operated by link $109^b$ and cam 110 on cam-shaft 33. The cams which operate drop-rollers 42, 51, and 109 and the cams which operate the side registering-gripper 102, switch-operating bar 92, and the auxiliary gage $53^×$ are all constructed alike, each cam being in the form shown in Figs. 14 and 15 of the drawings, in which the cam $x$ is shown with two low portions $x'$ and a circumferentially-adjustable cover-plate $x^2$, which is adapted to cover one of the low portions $x'$ when the machine is operating to make single thirty-six-page covered books or pamphlets and only one cover-sheet and one insert-sheet is delivered at each revolution and is adapted to be moved to one side of the low portion to expose the same when the machine is operating to make double twenty-page covered books or pamphlets, and two cover-sheets and two insert-sheets are delivered each revolution. The cams 71 and 81 of the sheet-actuated controlling mechanism are constructed as shown in Fig. 13 of the drawings, in which each cam $y$ has two low portions $y'$ and a removable cover portion $y^2$, adapted to cover one of the low portions $y'$. These cams operate with cover portion on when single thirty-six-page covered books are being made and with the cover off when double twenty-page covered books are being made.

Referring now to the central section C of the machine, Figs. 1, 6, 7, 10, 11, 12, 13, 19, 20, and 21, 100 and 101 are the first and second auxiliary sheet-conveyers. 55 is the third auxiliary sheet-conveyer, as above explained. These auxiliary conveyers 100, 101, and 55 converge to the point of common assemblage at gage 105, Figs. 6 and 7—that is, the point where the individual sheets or signatures or collections of sheets or signatures are gathered together preparatory to being passed as a whole to the stitching-machines. Mounted at the said assembling-point is the main assembling-gage 105, against which the several signatures or collections of signatures are registered. This gage 105 is supported in the usual guides and operated by the usual rock-arms 105ª, mounted on rock-shaft 105ᵇ, actuated by rock-arm 105ᶜ, link 105ᵈ, and cam 106 on shaft 33 to intermittently raise the gage out of the path of the sheets. Adjacent to this gage 105 is mounted the lower feed-roll 107 and the coöperating drop-rollers 107ª, which latter are also operated in the usual manner. (Not shown.) Keyed to a rock-shaft 111, extending transversely of the machine, are a series of sheet-deflecting fingers 111ª. These fingers 111ª are supported adjacent to the lower feed-roll 107. A rock-arm 112, Fig. 6, extends from the rock-shaft 111 and is connected through a link 113, bell-crank lever 114, and link 115 with a reciprocating operating-bar 116, Figs. 6, 10, 19, 20, and 21, which slides in a swiveled guide 116ª, Fig. 6, and is operated through bell-crank lever 116ᵇ, link 116ᶜ, and cam 117 on cam-shaft 33. This bar 116 is formed with a notch 118, Figs. 6, 10, 19, 20, and 21, in which is adapted to engage a pivotally-mounted pawl 119, Figs. 6, 10, 13, 19, 20, and 21, journaled at 119ª. The pawl 119 is pivotally connected to the lower end of a reciprocating bar 120, which is operated by a bell-crank lever 121, Figs. 6 and 13, and cam 122 on cam-shaft 33. The bar 120 carries a pivotally-mounted dog 125, Figs. 6, 10, 19, 20, and 21, formed with a heel 126, said dog being adapted to engage a notch 127, formed in a bracket 127ª, fixed to the machine-frame. 128 is the main controller-bar which is operated intermittently by a bell-crank lever 129, Figs. 6 and 10, and cam 130 on shaft 33. This bar 128, Figs. 6, 10, 19, 20, and 21, carries an adjustable tappet 131, which is adapted to engage the heel 126 of dog 125 for moving the dog out of the plane of the notch 127. Supported in the path of each of the auxiliary conveyers 100, 101, and 55 is a sheet-actuated tripping-finger 140, Figs. 6, 8, 9, 10, 19, 20, and 21, each one of which is mounted upon a rock-shaft 141, journaled upon the pointed screws 142, mounted in brackets 143. Each rock-shaft 141 also carries an upwardly-projecting heel 144, which rests directly beneath a rock-arm 145, keyed to a rock-shaft 146. The upper and lower rock-shafts 146 carry at their outer ends rock-arms 147, which are pivotally connected to the opposite ends of the vertically-movable controller-bar 128. The central rock-shaft 146 carries a rearwardly-projecting finger 150, which rests beneath a screw stop or tappet 151, carried upon the bar 128. This central rock-shaft 146 also carries a forwardly-projecting rock-arm 155, connected through a link 156 with a short rock-arm 157, keyed to a rock-shaft 157ª, journaled in bearings 157ᵇ in line with the upper trip-finger rock-shaft 141. This rock-shaft 157ª also carries a rock-arm 158, Fig. 12, formed with a laterally-projecting finger 158ª, Fig. 10ª, which rests normally above a rearwardly-projecting lug or finger 159, secured to the rock-shaft 141 of the upper tripping-finger 140. 160, Figs. 10, 11, and 12, is a coil-spring mounted upon the central rock-shaft 146 and having one end secured to an adjustable collar 161, Figs. 11 and 12, upon said shaft and its opposite end secured at 162 to the supporting-bracket 143. This spring 160 tends to hold the central rock-shaft 146 in position to cause the finger 150 to remain in close contact with and follow tappet 151, so that when the sheets have tripped the central and lower trip-fingers 140 and the bar 128 starts to move upwardly the movement of rock-arm 155, link 156, rock-arm 157, rock-shaft 157ª, rock-arm 158, and fingers 158ª 159 will actuate the upper trip-shaft 141 and move finger 144 out of path of arm 145 to allow bar 128 to move. When bar 128 moves upwardly, the dog 119 is moved into engagement with notch 118 of bar 116 to hold bar 116 so that the main switch 111ª will not be operated, and the assembled sheets will be allowed to pass forward to the stitching-machines. When, on the other hand, the upper and lower trip-fingers 140 are actuated by the passage of sheets, the upper and lower arms 145 will be released to allow bar 128 to move upwardly with the same result, the central rock-shaft 146 and connected rock-shaft 157ª being in this case held against movement by central trip-finger 144 and arm 145 without interfering with the action of the upper tripping device. The purpose of this peculiar construction for connecting up these several tripping devices is to enable the machine to operate in either of two ways for making large pamphlets of thirty-six pages each or small pamphlets of twenty pages each. In one method of running the machine both halves of the main sheet (which is cut in two as it passes through the first-fold rollers, the two halves passing through the independent second-fold rollers, from which the first and second sets of conveyers lead to the main point of assemblage) are taken by the first and second sets of conveyers to meet the previously-assembled insert and cover sheets which are carried forward by the third set of conveyer-tapes and are assembled at the main point of assemblage with the two halves of the main sheet. This assemblage of all the parts—that is, the two parts of the main sheet, the insert-sheet, and cover-sheet—is then passed in assembled condition to the main conveyer to be carried to the binding and final-fold and delivering mechanism. This is one method. Another method of operating the machine is to assemble one section of the main sheet with one insert and one cover sheet at the main gage and pass this assemblage forward to be bound into a pamphlet, while the other section of the main sheet is at the next operation assembled with the succeeding insert-sheet and cover-sheet to be formed into another pamphlet. The pamphlets formed by the second method are of course smaller than those formed by the first method, for the reason that only one section of the main sheet, representing sixteen pages, instead of both sections, representing thirty-two pages, is used in the second method. To accomplish this result, it is only necessary to have one connection between the tripping devices of the first and second conveyers and the controlling mechanism, for the reason that in the formation of the large pamphlets, when both sections of the main sheet are to be included in the same pamphlet, the presence of one will indicate the presence of the other, since it is practically impossible for one of the sections to get into trouble between the first-fold rollers and the main gage. This being the case, but one of the tripping devices is provided with a connection with the vertically-movable controller-bar. Then, on the other hand, when the machine is to be operated for producing small pamphlets, in which case the two parts of the main sheet are included in two successive and distinct pamphlets, it will be seen that it is necessary to have a construction which will allow the operation of the machine in the absence of one of the main-sheet sections from either the first or second sheet-conveyer, since in the production of these smaller pamphlets the main-sheet sections are supplied to the main gage, first by the first conveyer and then by the second conveyer, and so on, alternating from one conveyer to another. This being the case, it is necessary to arrange the tripping-fingers to the first and second conveyers in such a way that the presence of a main-sheet section on either side of these first and second conveyers will allow the operation of the machine. This result is accomplished in the same way by the arrangement shown and described—that is, by directly connecting up one of the controller-fingers with the controller-bar and having the other controller-finger disconnected from the controller-bar, but connected up with the first-named controller-finger, so that the first-named controller-finger will be actuated to release the controller-bar when there is a main-sheet section on either one of the first and second conveyers. In other words, the controller-finger of the first conveyer is capable of being actuated for allowing the proper operation of the machine by a main-sheet section on the first conveyer or on the second conveyer. 170, Figs. 6 and 7, is a side-registering gripper operated by an oscillating arm or frame 171, connected through link 172, bell-crank lever 173, and pitman 174, with an operating-cam 175 on cam-shaft 33. This side-registering mechanism operates to pull the insert-sheet and cover into proper gaged position on auxiliary conveyer 55 immediately before the sheets are assembled at the main assembling-gage 105.

Section D of the machine, which will now be described, includes the main conveyer, the stitching-machines, and the final-fold and delivery mechanisms. Tapes 180, Figs. 8 and 9, leading from the lower feed-roll 107 of section C to the final-fold mechanism, constitute the main-sheet conveyer. 185 is the two-armed sheet-arresting gage for positioning the sheets for the stitching operation. This gage is operated in the usual manner and is timed to arrest a set of signatures in front of the stitching-machines once every revolution of the machine when the machine is producing single thirty-six-page covered books or pamphlets and twice every revolution of the machine when producing double twenty-page covered books or pamphlets. 190 and 191 are the stapling or stitching machines, operated through suitable gearing in the usual manner. An adjustable arm 195 carries a power-transmitting gear-wheel 196, which is adapted to transmit motion from the driving-gear 197 to either of the driven gears 198 and 199 of the stitcher-operating mechanism to cause the stitcher to operate at different speeds. The gear 196 is mounted on a stud $195^a$ of arm 195 and is held in the desired position thereon by collars $196^a$. To shift the gear to change the speed of the stitchers, the collars $196^a$ are loosened and gear 196 shifted into position to mesh with the desired gear 198 or 199 of the stitcher. The stitcher 190 is adjustable upon the machine-frame with relation to the stitcher 191, toggle-arms $190^a$ and $191^a$ being journaled upon the stitcher-driving shafts and pivoted to each other and carrying on their pivotal connection a freely-journaled gear $191^b$ for transmitting power from one stitcher-shaft to the other. The adjustment of stitcher 190 is effected by rack-bar $190^b$ and pinion $190^c$. The stationary stapling-machine 191 also has a throw-out clutch for controlling the operation of the two stapling-machines. This clutch is preferably in the form of the clutch shown and described in my above-named patent, No. 632,448, of September 5, 1899, and it will not be necessary to describe the same in detail in my present case. 200 is the clutch-dog mounted on the loosely-journaled clutch member and adapted to lock the loose member to the fixed member on the stitcher-shaft. 201 $201^a$ constitute the tripping-lever, mounted upon rock-shaft 202, from which extends a rock-arm 203, connected by link 204 with a curved rock-arm 205, keyed to the rock-shaft 111, Fig. 6, of the main sheet-deflecting switch. It will be observed that when switch $111^a$ is in normal position to allow the assembled signatures to pass freely forward in the machine the stitcher-clutch will be in clutched position to operate the stitching-machines. When, however, the switch $111^a$ is deflected to throw out sheets, the clutch will be thrown out. 207, Figs. 8 and 9, is a header-up device mounted on a rock-arm 208 and operated through link 208ᵃ by a cam 209. This header-up device shifts the assembled collection of signatures with respect to the stitching-machines just prior to the stitching operation to insure the placing of the staples in the center or line of final fold of the signatures. Immediately after the operation of the stitching-machines the gage 185 is elevated and the stapled sheets are carried forward again until they engage the final-fold gage 210, after which another header-up device, 211, comes into play to position the sheets for the final fold. The final-fold knife 215 then forces the stapled sheets down through the final-fold rollers 216, and the completed book or pamphlet is passed by the usual tapes to packing-box 220, supported beneath the rollers 216 and provided with the reciprocating plunger or packer 225, which is operated in the usual manner. When single thirty-six-page books are delivered, they are packed in one end of the packing-box, the plunger 225 operating on one stroke only; but when double twenty-page books are delivered the plunger packs them in both ends of the packing-box, a book being engaged on each stroke of the plunger.

The main driving-shaft 1 is geared to drive cam-shaft 2 and other rotating parts in section A of the machine.

250, Figs. 1 and 2, is a power-transmitting shaft driven through suitable gearing by main shaft 1, and all of the operative parts of the machine are suitably geared to and driven by the shaft 250.

The cams 106, 117, and 175, which operate main gage 105, throw-out-operating bar 116, and side registering-gripper 170, are constructed as shown in Figs. 14 and 15 of the drawings and hereinbefore explained. The cams 120 and 130 of the main-sheet-actuated controlling devices are constructed as shown in Fig. 13 of the drawings. The side-registering grippers 9, 102, and 170 are constructed substantially as shown and described in my prior patents, No. 599,319, of February 2, 1898, and No. 669,724, of March 12, 1901.

My improved machine may be operated to produce bound and covered pamphlets of thirty-six pages or bound and covered pamphlets of twenty pages. I will first describe the operation of the machine when it is working at its full capacity for producing the larger pamphlets.

The main sheet, the insert-sheet, and the cover-sheet are fed to the machine at three different points, it being preferable to feed the main sheet and cover-sheet by automatic feeding-machines and the insert-sheet by hand. The main sheet, being of a size to form two sixteen-page signatures, is fed by the main drop-roller mechanism to the main folding-machine section A of the machine, where it is folded longitudinally and passed by suitable conveyer-tapes into one side of section C of the machine, the once-folded double sheet being cut in two by the rotary slitter as it passes through the first-fold mechanism. The two parts of the main divided folded sheet move into engagement with the end gages of the second-fold mechanism of the assembling-machine, and immediately after they are registered the knives of the second-fold mechanism pass the two parts of the main sheet down through the folding-rollers, from which they are conveyed forwardly upon the first and second auxiliary conveyers. These twice-folded parts of the main sheet then pass the first and second tripping devices, respectively, and if the insert and cover sheets have been properly fed into the machine will meet said insert and cover sheets and be superposed upon them at the main assembling-gage. After the sheets have been properly assembled by said gage the gage is moved out of the path of the sheets and the assembled sheets pass forward through the machine until they are arrested by the stitcher-gage. At this point in the machine the first header-up device moves the assembled sheets laterally of the machine to accurately place the central longitudinal line of the assembled sheets in proper position for the reception of the wire staples. The stitching devices then operate and the sheets are bound together. Immediately after this the stitcher-gage is moved out of the path of the sheets and the bound sheets pass forwardly until they are arrested by the gage of the final-folding mechanism, at which point the second heading-up or jogging device accurately positions the bound sheets to insure the final fold being made upon the line of the staples. The final-folding mechanism then operates to fold the bound sheets into the cover and to pass the completed pamphlet to the packing-box.

After the main sheet has started into the first-fold mechanism from the main feeding-machine the insert-sheet is fed by hand from the feed-board to the first auxiliary drop-roller mechanism, and the cover-sheet is fed automatically by the auxiliary feeding-machine to the second set of auxiliary drop-rollers, said auxiliary drop-roller mechanisms passing the sheets to subauxiliary conveyer-tapes, which are arranged one above the other in converging planes. Each of these insert and cover sheets passes a tripping device connected to the controlling mechanism of the first or auxiliary throw-out switch. If the insert and cover sheets have been properly fed to the machine, the trippers will be actuated and the switch will be moved into inactive position, so that the insert and cover sheets will pass together and be assembled at the first or auxiliary assembling-gage. Immediately after this the auxiliary assembling-gage is moved out of the path of the assembled insert and cover sheets, and they are carried forwardly in the machine by the third auxiliary conveyer and caused to actuate the third one of the main series of controlling-trippers, which control the main throw-out switch and stitching-machines. At the moment that the previously-assembled insert and cover sheets reach the main tripping devices the first and second parts of the main sheet have also reached the first and second of the main tripping devices, so that the two parts of the main sheet, the insert-sheet, and the cover-sheet pass together to the main assembling-gage, as above explained.

Referring to Figs. 16 to 21 of the drawings, in which I have represented the several stages of operation of the machine during the operation of producing two twenty-page covered pamphlets at each revolution of the machine, the successive positions of the sheets or signatures will now be explained. These figures of the drawings represent a case in which there has been a failure to properly feed into the machine an insert-sheet or a cover-sheet. In the particular case illustrated the cover-sheet is the one which has been lost or omitted; but it will be clear that the operation will be substantially the same when the insert-sheet is omitted.

In Fig. 16 the insert-sheet I is shown traveling with subauxiliary conveyer 43 and actuating the tripping-finger 61; but the cover-sheet has failed to pass into the machine on the subauxiliary conveyer 52, and hence the tripping-finger 60 has not been actuated, so that it still remains in engagement with the lower finger 65 of the rock-shaft 66 and the stop-bar 70 will not be allowed to move upwardly to shift the dog 76 out of the path of the notch 75$^a$. The result of this omission of the cover-sheet, therefore, is that the dog 76 will still engage the notch 75$^a$ and prevent the upward movement of the bar 78, which controls the dog 90, so that the dog 90 will be held out of engagement with the notch 91 of the switch-operating bar 92. When, therefore, the cover-sheet is missing and the insert-sheet is present, or vice versa, the switch 97 will be moved into active position, as shown in Figs. 16 and 17, for deflecting the sheet which was fed in.

In Fig. 17 it will be observed that the first insert-sheet I has passed forward and engaged the switch 97, which has deflected it downwardly out of the path of the tapes. In this view Fig. 17, a second insert-sheet I' and a cover-sheet C' are shown passing forwardly in the machine from the hand-feeder and automatic feeder, these sheets being in proper position under the tripping devices 60 and 61, causing the tripping-heels 64 to move out of engagement with the fingers 65 of rock-shafts 66, so that the stop-bar 70 is free to move upwardly by the action of its controlling-cam. This upward movement of the stop-bar 70 carries the screw 83 into engagement with the heel of the dog 76, thereby moving the dog out of the path of the notch 75$^a$, formed in the stop-bar. The dog 76 being thereby freed from the stop-bar, the bar 78 is free to move upwardly under the action of its controlling-cam, so that the dog 90 will be moved on its journal into position to engage the notch 91, formed in the switch-operating bar 92. This prevents the operation of the switch, and the cover and insert sheets pass on to the position shown in Fig. 18.

In Fig. 18 it will be observed that the dog 90 has engaged the bar 92, so as to hold the bar against forward movement and retain the switch 97 in its inactive position. With the switch in this position it will be observed that the second insert and cover sheets I' and C' will pass forwardly together over the switch 97 to the third auxiliary conveyer 55. In this figure the first insert-sheet I has dropped to the receiving-box R beneath the machine and the third insert and cover sheets I$^2$ and C$^2$ are shown as just passing into the machine under the tripping-fingers 60 and 61 to again control the operation of the switch in the manner which has just been explained.

In Fig. 19 it will be observed that the assembled insert and cover sections I' and C' are moving forwardly on conveyer 55 to the main set of tripping devices, which control the main throw-out switch, the main-sheet section M has passed beneath upper tripping device 140, and the second main-sheet section M$^a$, which will form a part of the second sixteen-page pamphlet, is just leaving the folding mechanism. The folding mechanisms for the first and second sections of the main sheet are so adjusted when the machine is making up sixteen-page pamphlets that the first section will pass through the machine in advance of the second section and will form a part of the pamphlet which is completed just prior to the one in which the second section of the main sheet is included.

Since the first cover-sheet was not fed to the machine and the first insert-sheet I was switched out of the machine, as explained in connection with Figs. 16, 17, and 18, there will be no insert and cover sheets present under the lower tripping device 140 of auxiliary conveyer 55 when the first section M of the main sheet reaches its tripping device on auxiliary conveyer 100, and consequently the controller-bar 128 will be held against vertical movement by the engagement of the heel of the lowest tripping-finger 140 with the finger 145 of rock-shaft 146, to which the bar 128 is connected. This being the case, the bar 128 will not be allowed to move the dog 125 out of the path of the notch 127 in bar 128, and said dog 125 will therefore engage said notch and prevent the upward movement of the bar 120, so that the dog 119 will be held in its raised position and will not be allowed to engage the notch 118 in the main switch-operating bar 116, and bar 116 will therefore move forwardly to place the main switch 111$^a$ in its sheet-deflecting position. The absence of the first insert and cover sheets from beneath the lowest tripping-finger 140 at the time the first section M of the main sheet actuates upper tripper 140 will therefore result in the switch 111ª being moved into operative position, as shown in Figs. 19 and 20.

In Fig. 20 the first section M of the main sheet is shown passing from the machine into the box R', the switch 111ª having engaged the advancing main-sheet section and thrown it out of the machine. In this figure the second section Mª of the main sheet has reached the second or central tripping device 140 and has actuated it and the second insert and cover sheets I' and C', assembled one on top of the other, have reached the third or lowest tripping-finger 140 and actuated it. The result of the simultaneous operation of the central and the lowest tripping-fingers is as indicated and release of the controller-bar 128, so that the bar will be allowed to move upwardly and throw the dog 125 out of engagement with the notch 127, and this in turn will allow the bar 120 to move upwardly for throwing down the dog 119 into the path of the notch 118 of the switch-operating bar 116. The result of this is as shown in Fig. 21 of the drawings, the switch-operating bar 116 being held against movement by the engagement of dog 119, so that the switch 111ª will be held in its inactive position to allow the assembled cover-section C', insert-section I', and second section Mª of the main sheet to pass together over the switch, as shown in Fig. 21, and onto the main conveyer through the succeeding mechanisms referred to. Referring again to Fig. 20, it will be observed that a second main sheet has been folded and cut in two to form signatures M' and Mª', which are shown in gaged position above the second-fold mechanism. It will also be observed in this figure that the third cover and insert sections Cª and Iª are part way between the auxiliary switch and the main tripping devices.

In Fig. 21 the sections M' and Mª' of the second main sheet are represented as having passed through their folding mechanisms, the former of which, section M', being shown in position under its tripping device, while the latter section, Mª', has not yet reached its tripping device. In this figure the upper and lower tripping-fingers 140, having been actuated by the main-sheet section M' and the cover and insert sheets Cª and Iª, the switch-controlling devices will still maintain the throw-out switch in its inactive position, so that these sheets will pass forward in the machine in the same manner as the preceding sheets just referred to. Fig. 21 also shows the succeeding cover and insert sheets advancing toward the main tripping devices.

Referring again to the above-described switching out of the first section M of the first main sheet, as illustrated in Figs. 19 and 20, it will be observed that the switch-operating bar 116, through rock-shaft 111 and bar 204, also controls the wire-stitching devices, so that when the main throw-out switch 111ª is moved into position to switch out one of the main-sheet sections the stitching devices will also be thrown out of operation, so that at the moment when the thrown-out signatures are due to arrive in position under the stitching devices the stitchers will not operate, because there will be no pamphlet there to be bound.

After the main signature Mª, insert sheet I', and cover-sheet C' have passed the main tripping-fingers, so as to insure the inactive position of the main throw-out switch, these sheets are momentarily arrested by the main assembling-gage 105, which brings them into registry. Immediately after the registry of the assembled signatures and cover the assembling-gage is moved out of the path of the sheets and they again start forward in the machine, upon the main conveyer-tapes 180, passing freely over the throw-out switch, which is in its inoperative position. The travel of the assembled signatures is next arrested by the gage of the stitching-machines, and immediately after the signatures are arrested in this position the first heading-up device comes into play to properly position the assembled sheets with relation to the stitching mechanism. The sheets are then stapled for binding them together, and the stitcher-gage is moved out of their path, and they again travel forwardly until arrested by the gage of the final-folding mechanism. Here the bound sheets are acted upon by the second header-up device for accurately registering the line of stitching with the line of final fold, and when this has been accomplished the final-fold mechanism operates to complete the pamphlet and deliver it from the machine.

While I have illustrated and described my invention as applied to a machine in which the parts of an incomplete book or pamphlet are switched out of the machine at various points, I would have it understood that I do not intend to limit myself to this specific embodiment of the same. The sheets may be otherwise controlled—such, for instance, as by passing them entirely through the machine, as covered by another application, which I filed February 29, 1904, Serial No. 195,835.

Having thus described my invention, what I claim as new therein, and desire to secure by Letters Patent, is—

1. In a machine of the character described, the combination of a plurality of assembling mechanisms adapted to assemble sheets at a plurality of points, with controlling means actuated by the sheets assembled at one point and controlling the disposition of sheets assembled at another point, substantially as set forth.

2. In a machine of the character described, the combination of a plurality of assembling mechanisms adapted to successively assemble sheets or signatures at a plurality of points, with controlling means constructed and arranged to be operated by the sheets or signatures assembled at one point to control the disposition of the sheets or signatures subsequently assembled at another point, substantially as set forth.

3. In a machine of the character described, the combination of a plurality of assembling mechanisms adapted to assemble sheets or signatures at a plurality of points, means conveying the assembled sheets or signatures to a common assembling-point, sheet-actuated controlling means constructed and arranged to control the sheets or signatures assembled at one point, and sheet-actuated controlling means adapted to determine the disposition of the sheets or signatures assembled at the common point of assembling, substantially as set forth.

4. In a machine of the character described, the combination of a plurality of assembling mechanisms adapted to assemble sheets at a plurality of points, with a plurality of independent sheet-actuated controlling devices, each of which devices controls the disposition of sheets assembled at one point, substantially as set forth.

5. In a machine of the character described, the combination of a plurality of assembling mechanisms adapted to assemble sheets at a plurality of points, with a plurality of sets of independent sheet-actuated tripping devices, and a plurality of sheet-controlling mechanisms, one of which is under control of each set of tripping devices, substantially as set forth.

6. In a machine of the character described, the combination of a plurality of assembling mechanisms adapted to successively assemble sheets or signatures at a plurality of points, with a plurality of sheet-actuated controlling devices, each of which controls the disposition of sheets or signatures assembled at one point, whereby the first-assembled sheets or signatures control the disposition of the subsequently-assembled sheets or signatures, substantially as set forth.

7. In a machine of the character described, the combination of a plurality of assembling mechanisms adapted to assemble sheets or signatures at a plurality of points, means conveying the assembled sheets or signatures to a common assembling-point, and a plurality of independent sheet-actuated controlling devices adapted to determine the disposition of the sheets or signatures assembled at the several points of assembling, substantially as set forth.

8. In a machine of the character described, the combination of a plurality of assembling mechanisms adapted to assemble sheets or signatures at a plurality of points, means conveying the assembled sheets or signatures to a common assembling-point, controlling means constructed and arranged to be operated by the sheets and signatures assembled at one point to control the disposition of sheets or signatures assembled at another point, and sheet-actuated controlling means adapted to determine the disposition of the sheets or signatures assembled at the common point of assembling, substantially as set forth.

9. In a machine of the character described, the combination of a main conveyer for assembled sheets or signatures, a sheet-controlling device interposed in the path of the main conveyer, a plurality of auxiliary sheet-conveyers leading to said main conveyer, a sheet-actuated tripping device interposed in the path of each auxiliary conveyer and adapted to control the sheet-controlling device of the main conveyer, an auxiliary sheet-controlling device interposed in the path of one of the auxiliary conveyers, a plurality of subauxiliary conveyers leading to one of the auxiliary conveyers, and a sheet-actuated tripping device arranged in the path of each subauxiliary conveyer and controlling the sheet-controlling device of the auxiliary conveyer, substantially as set forth.

10. In a machine of the character described, the combination of a main conveyer for assembled sheets or signatures, a sheet-controlling device interposed in the path of the main conveyer, a plurality of auxiliary sheet-conveyers leading to said main conveyer, a sheet-actuated tripping device interposed in the path of each auxiliary conveyer and adapted to control the sheet-controlling device of the main conveyer, an auxiliary sheet-controlling device interposed in the path of each of the auxiliary conveyers, a plurality of subauxiliary conveyers leading to the assembling-point of the auxiliary conveyers, and a sheet-actuated tripping device arranged in the path of each subauxiliary conveyer and controlling the sheet-controlling devices of their respective auxiliary conveyers, substantially as set forth.

11. In a machine of the character described, the combination of a main conveyer for assembled sheets or signatures, a main sheet-deflecting switch interposed in the path of the main conveyer, a plurality of auxiliary conveyers leading to said main conveyer, a sheet-actuated tripping device interposed in the path of each auxiliary conveyer and suitably connected with the main sheet-deflecting switch of the main conveyer, an auxiliary sheet-deflecting switch interposed in the path of one of the auxiliary conveyers, a plurality of subauxiliary conveyers leading to one of the auxiliary conveyers, and a sheet-actuated tripping device arranged in the path of each subauxiliary conveyer and controlling the operation of the auxiliary switch, substantially as set forth.

12. In a machine of the character described, the combination of a main conveyer for assembled sheets or signatures, a device interposed in the path of the main conveyer adapted to act upon the assembled sheets or signatures, a plurality of auxiliary conveyers leading to said main conveyer, a sheet-actuated tripping device interposed in the path of each auxiliary conveyer and suitably connected with first-named device, a sheet-deflecting switch interposed in the path of one of the auxiliary conveyers, a plurality of subauxiliary conveyers leading to the said auxiliary conveyer, and a sheet-actuated tripping device arranged in the path of each subauxiliary conveyer and controlling the operation of the switch, substantially as set forth.

13. In a machine of the character described, the combination of a plurality of sheet-conveyers, a plurality of assembling-gages, one for each point of assemblage, a plurality of throw-out switches, one for each point of assemblage, and sheet-actuated means, the sheet-actuated means being constructed and arranged to be operated by the passing sheets or signatures and unitedly close said switches, substantially as set forth.

14. In a machine of the character described, the combination of three sheet-conveyers adapted to assemble sheets at a common point, means controlling the disposition of the sheets at the point of assemblage, a sheet-actuated tripping device supported in the path of each sheet-conveyer, means operatively connecting two of said tripping devices with the sheet-controlling means, and means connecting the third tripping device with one of the other tripping devices, substantially as set forth.

15. In a machine of the character described, the combination of a plurality of sheet-conveyers adapted to assemble sheets or signatures at a common point, sheet-controlling means constructed and arranged to control the disposition of sheets or signatures at the point of assemblage, a plurality of sheet-actuated tripping devices supported in the paths of some of said conveyers and operatively connected with the controlling means, and another sheet-actuated tripping device supported in the path of another one of said conveyers and operatively connected with one of the controller-connected tripping devices and detached from the controlling means, substantially as set forth.

16. In a machine of the character described, the combination of a plurality of sheet-conveyers adapted to assemble sheets at a common point, suitable controlling means including a movable controller-bar, members connected with said controller-bar for preventing its movement, a plurality of sheet-actuated tripping devices adapted to engage said controller-bar members, and another sheet-actuated tripping device operatively connected with one of said first-named tripping devices, substantially as set forth.

17. In a machine of the character described, the combination of a main conveyer for assembled sheets or signatures, a sheet-controlling device interposed in the path of the main conveyer, a plurality of auxiliary sheet-conveyers leading to said main conveyers, a sheet-actuated tripping device interposed in the path of each auxiliary conveyer, means connecting two of said tripping devices with the sheet-controlling device, and means connecting the third tripping device with one of the other two tripping devices, substantially as set forth.

18. In a machine of the character described, the combination of a main conveyer for assembled sheets or signatures, a sheet-deflecting switch interposed in the path of the main conveyer, a plurality of auxiliary conveyers leading to said main conveyer, a sheet-actuated tripping device interposed in the path of each auxiliary conveyer, controlling means suitably connected with the sheet-deflecting switch, means connecting two of the tripping devices with the controlling means, and a loose-joint connection between the third tripping device and one of the other two tripping devices, substantially as set forth.

19. In a machine of the character described, the combination of a main conveyer for assembled sheets or signatures, a sheet-controlling device interposed in the path of the main conveyer, a plurality of auxiliary sheet-conveyers leading to said main conveyer, a sheet-folding mechanism, means for cutting into two parts the sheets passed through said folding mechanism, means for conveying the two sections of said sheets to two of the auxiliary conveyers, and a sheet-actuated tripping device interposed in the path of each auxiliary conveyer and adapted to control the sheet-controlling device of the main conveyer, the tripping device of one of the conveyers being detached from the controlling device and operatively connected with another tripping device, substantially as set forth.

20. In a machine of the character described, the combination of a main conveyer for assembled sheets or signatures, a sheet-controlling device interposed in the path of the main conveyer, a controller-bar connected therewith, a plurality of auxiliary sheet-conveyers leading to said main conveyer, a sheet-actuated tripping device interposed in the path of each auxiliary conveyer and adapted to control the sheet-controlling device of the main conveyer, rock-shafts having arms connected with the controller-bar, fingers connected with said rock-shafts and engaged by some of said tripping devices, a rock-shaft disconnected from said controller-bar and carrying a finger engaged by one of said tripping devices, and a connection between said disconnected rock-shaft and one of the tripping devices which engage the fingers of the controller-connected rock-shafts, substantially as set forth.

21. In a machine of the character described, the combination of three conveying mechanisms leading to a common assembling-point, a gage at said assembling-point, and operating means constructed and arranged to cause two of said mechanisms to alternately deliver their sheets, signatures, or collections of sheets or signatures at the assembling-gage and assemble the successive sheets, signatures or collections of sheets or signatures conveyed by the third mechanism alternately with the sheets, signatures or collections of sheets or signatures conveyed by said other two mechanisms, thereby producing assemblages of two sheets, signatures or collections of sheets or signatures, substantially as described.

22. In a machine of the character described, the combination of three conveying mechanisms leading to a common assembling-point, a gage at said assembling-point, and operating means constructed and arranged to cause one of said mechanisms to assemble its sheets, signatures or collections of sheets or signatures alternately with the sheets, signatures, or collections of sheets or signatures delivered by the other two mechanisms, thereby producing assemblages of two sheets, signatures or collections of sheets or signatures, substantially as described.

23. In a machine of the character described, the combination of a plurality of conveying mechanisms adapted to convey sheets, signatures or collections of sheets or signatures to a common assembling-point, a gage arranged at the point of assembling, controlling means adapted to control the disposition of the sheets, signatures or collections of sheets or signatures conveyed to the gage, a sheet-actuated tripping device interposed in the path of each conveying mechanism and operatively connected with said sheet-controlling means, and means for operating said mechanisms so constructed and arranged that the sheets, signatures or collections of sheets or signatures conveyed by one of said mechanisms will be assembled in turns with the sheets, signatures, or collections of sheets or signatures delivered by the other mechanisms successively, the sheets, signatures or collections of sheets or signatures from said other mechanisms forming parts of different assemblages, substantially as described.

24. In a machine of the character described, the combination of a plurality of sheet-conveying mechanisms leading to a common assembling-point, a sheet-controlling device at or adjacent to said assembling-point, a sheet-actuated tripping device interposed in the path of each conveying mechanism and adapted to control said sheet-controlling device, the tripping device of one of the conveyers being detached from the controlling device and operatively connected with another tripping device which is connected with the controlling device, and means for operating the several conveying mechanisms, said operating means being so constructed and arranged that the sheets, signatures or collections of sheets or signatures conveyed by one mechanism will be assembled in turns with the sheets, signatures or collections of sheets or signatures delivered by the other mechanisms successively, the sheets, signatures or collections of sheets or signatures from said other mechanisms or signatures forming parts of different assemblages, substantially as described.

25. In a machine of the character described, the combination of a plurality of conveying mechanisms adapted to convey sheets, signatures or collections of sheets or signatures to an assembling-point, operating means for said plurality of conveying mechanisms, constructed and arranged to cause said mechanisms to successively deliver their sheets, signatures or collections of sheets or signatures to the assembling-point, an independent conveying mechanism also adapted to convey sheets, signatures or collections of sheets or signatures to the said assembling-point, operating means for said independent conveying mechanism constructed and arranged to cause it to deliver its successive sheets, signatures or collections of sheets or signatures to said assembling-point to successively meet, one at a time, the sheets, signatures or collections of sheets or signatures from said plurality of conveying mechanisms, and an assembling-gage at said assembling-point adapted to assemble each successive sheet, signature or collection of sheets or signatures from the independent conveying mechanism with one of the sheets, signatures or collections of sheets or signatures delivered by one of the said plurality of conveying mechanisms, substantially as set forth.

26. In a machine of the character described, the combination of a plurality of conveyers adapted to convey sheets, signatures or collections of sheets or signatures to an assembling-point, operating means for said conveyers constructed and arranged to cause two or more of said conveyers to successively deliver their sheets, signatures or collections of sheets or signatures to said assembling-point and one of said conveyers to deliver a sheet, signature or collection of sheets or signatures to the assembling-point to meet each one of the sheets, signatures or collections of signatures delivered by said two or more conveyers, and an assembling-gage at the assembling-point adapted to successively assemble the meeting sheets, signatures or collections of sheets or signatures, each assemblage being made up of deliveries from two conveyers, as set forth.

27. In a machine of the character described, the combination of a main conveyer for assembled sheets or signatures, a mechanism interposed in the path of the main conveyer adapted to act upon complete assemblages of sheets or signatures, a plurality of auxiliary conveyers leading to said main conveyer, a sheet-actuated tripping device interposed in the path of each auxiliary conveyer, a plurality of subauxiliary conveyers leading to one or more of the auxiliary conveyers, a sheet-actuated tripping device arranged in the path of each subauxiliary conveyer, a controller arranged to control the operation of said mechanism, and means operatively connecting all of said tripping devices with said controller, whereby the absence of a sheet or signature from any one of the conveyers will cause the arrest of operation of said mechanism when the incomplete assemblage of sheets or signatures is presented to it, and, when all of the sheets or signatures of an assemblage are present upon their respective conveyers at the proper time, said controller will be so controlled that it will throw into action said mechanism to cause it to operate upon said complete assemblage of sheets or signatures when said complete assemblage is presented to the said mechanism, substantially as set forth.

28. In a machine of the character described, the combination of a main conveyer for assembled sheets or signatures, a stapling or stitching machine interposed in the path of the main conveyer adapted to bind complete assemblages of sheets or signatures, a plurality of auxiliary conveyers leading to said main conveyer, a sheet-actuated tripping device interposed in the path of each auxiliary conveyer, a plurality of subauxiliary conveyers leading to one or more of the auxiliary conveyers, a sheet-actuated tripping device arranged in the path of each subauxiliary conveyer, a controller arranged to control the operation of said stapling or stitching machine, and means operatively connecting all of said tripping devices with said controller, whereby the absence of a sheet or signature from any one of the conveyers will cause the arrest of operation of said machine when the incomplete assemblage of sheets or signatures is presented to it, and, when all of the sheets or signatures of an assemblage are present upon their respective conveyers at the proper time, said controller will be so controlled that it will throw into action said stapling or stitching machine to cause it to bind said complete assemblage of sheets or signatures when said complete assemblage is presented to the stapling or stitching machine, substantially as set forth.

TALBOT C. DEXTER.

Witnesses:
 WM. E. KNIGHT,
 HERVEY S. KNIGHT.